US008467460B2

(12) United States Patent
Mitasaki et al.

(10) Patent No.: US 8,467,460 B2
(45) Date of Patent: Jun. 18, 2013

(54) VIDEO PROCESSING METHOD AND APPARATUS, VIDEO PROCESSING PROGRAM, AND STORAGE MEDIUM WHICH STORES THE PROGRAM

(75) Inventors: Tokinobu Mitasaki, Yokosuka (JP); Kazuto Kamikura, Yokosuka (JP); Naoki Ono, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 486 days.

(21) Appl. No.: 12/517,534

(22) PCT Filed: Dec. 26, 2007

(86) PCT No.: PCT/JP2007/074949
§ 371 (c)(1),
(2), (4) Date: Jun. 3, 2009

(87) PCT Pub. No.: WO2008/081813
PCT Pub. Date: Jul. 10, 2008

(65) Prior Publication Data
US 2010/0067584 A1 Mar. 18, 2010

(30) Foreign Application Priority Data
Dec. 28, 2006 (JP) ................................. 2006-353610

(51) Int. Cl.
*H04N 11/02* (2006.01)
*H04N 11/04* (2006.01)
(52) U.S. Cl.
USPC .................................................. 375/240.29
(58) Field of Classification Search
USPC ................................................... 375/240.29
See application file for complete search history.

(56) References Cited

U.S. PATENT DOCUMENTS

| 5,181,105 A | 1/1993 | Udagawa et al. |
| 5,490,233 A | 2/1996 | Kovacevic |

(Continued)

FOREIGN PATENT DOCUMENTS

| CN | 1288641 A | 3/2001 |
| CN | 1299560 A | 6/2001 |

(Continued)

OTHER PUBLICATIONS

Gonzalez, Rafael C., et al., "Digital Image Processing," Tekhnosfera, Moscow, 2006, pp. 200-209 and 366-377, translation of 2002 edition, Prentice Hall, pp. 128-134 and 245-248.

(Continued)

*Primary Examiner* — Christopher S Kelley
*Assistant Examiner* — Maria Vazquez Colon
(74) *Attorney, Agent, or Firm* — Harness, Dickey & Pierce, P.L.C.

(57) ABSTRACT

A video processing method includes dividing a processing target image, which forms a video image, into a plurality of divided areas; determining a bandwidth applied to the divided areas; computing a filter coefficient array for implementing frequency characteristics corresponding to a band limitation using the bandwidth; subjecting the image data to a filtering process using the filter coefficient array; deriving a value of error information between the obtained data and the original image data, and computing an allocation coefficient used for determining an optimum bandwidth, based on the derived value; determining, for each divided area, the optimum bandwidth corresponding to the allocation coefficient, and computing an optimum filter coefficient array for implementing the frequency characteristics corresponding to a band limitation using the optimum bandwidth; subjecting the image data of the divided area to a filtering process using the optimum filter coefficient array; and synthesizing the obtained data of each divided area.

17 Claims, 25 Drawing Sheets

U.S. PATENT DOCUMENTS

| | | | |
|---|---|---|---|
| 5,835,237 | A | 11/1998 | Ebrahimi |
| 6,792,152 | B1 | 9/2004 | Shibata et al. |
| 2004/0008772 | A1 | 1/2004 | Kojima |
| 2004/0179743 | A1* | 9/2004 | Shibata et al. ............... 382/239 |
| 2005/0123038 | A1* | 6/2005 | Otsuka et al. ............ 375/240.03 |

FOREIGN PATENT DOCUMENTS

| | | |
|---|---|---|
| EP | 0 907 255 A1 | 4/1999 |
| EP | 1033883 A1 | 9/2000 |
| EP | 1065881 A1 | 1/2001 |
| EP | 1 239 679 A2 | 9/2002 |
| EP | 1 643 774 A2 | 4/2006 |
| JP | 5-227513 A | 9/1993 |
| JP | 6-070299 A | 3/1994 |
| JP | 06-225276 A | 8/1994 |
| JP | 9-298753 A | 11/1997 |
| JP | 2000-175192 A | 6/2000 |
| JP | 2001-231038 A | 8/2001 |
| JP | 2005-026747 A | 1/2005 |
| JP | 2005-175621 A | 6/2005 |
| JP | 2005-244346 A | 9/2005 |
| RU | 2 222 873 C2 | 1/2004 |
| WO | 99/13646 A2 | 3/1999 |
| WO | WO-99/45713 A1 | 9/1999 |
| WO | WO-00/18129 A1 | 3/2000 |
| WO | 01/08306 A1 | 2/2001 |
| WO | 2004/036919 A1 | 4/2004 |

OTHER PUBLICATIONS

Shang, Yi, et al., "Optimization Design of Filter Banks in Subband Image Coding," Proceedings of IEEE Symposium on Application-Specific Systems and Software Engineering and Technology, ASSET'99, IEEE, 1999, pp. 112-119.

Sun, X. Z., et al., "Adaptive Schemes for Noise Filtering and Edge Detection by Use of Local Statistics," IEEE Transactions on Circuits and Systems, vol. 35, No. 1, Jan. 1988, pp. 57-69.

* cited by examiner

FIG. 3

| ALLOCATION COEFFICIENT X | OPTIMUM BANDWIDTH r2 |
|---|---|
| $X < A_1$ | $B_1$ |
| $A_1 \leqq X < A_2$ | $B_2$ |
| $A_2 \leqq X < A_3$ | $B_3$ |
| ⋮ | ⋮ |
| $A_{n-3} \leqq X < A_{n-2}$ | $B_{n-2}$ |
| $A_{n-2} \leqq X < A_{n-1}$ | $B_{n-1}$ |
| $A_{n-1} \leqq X$ | $B_n$ |

FIG. 5A

ORIGINAL IMAGE DATA SIZE: 1920×1080

| BLOCK SIZE D | FIRST BANDWIDTH r1 | DIVISION NUMBER E |
|---|---|---|
| (1920×1080) | C1 | 1 |
| (960×540) | 0.5 | 2 |
| (640×360) | C3 | 3 |
| (480×270) | C4 | 4 |
| (384×216) | C5 | 5 |
| (320×180) | C6 | 6 |
| (192×108) | C7 | 8 |
| ⋮ | ⋮ | ⋮ |

FIG. 5B

ORIGINAL IMAGE DATA SIZE: 720×480

| BLOCK SIZE D | FIRST BANDWIDTH r1 | DIVISION NUMBER E |
|---|---|---|
| (720×480) | C1 | 1 |
| (360×240) | 0.5 | 2 |
| (240×160) | C3 | 3 |
| (180×120) | C4 | 4 |
| (144×96) | C5 | 5 |
| (120×80) | C6 | 6 |
| (90×60) | C7 | 8 |
| ⋮ | ⋮ | ⋮ |

| 0.7 | 0.8 | 0.7 |
|---|---|---|
| 0.7 | 0.9 | 0.7 |
| 0.7 | 0.8 | 0.7 |

| 0.7 | 0.8 | 0.7 |
|---|---|---|
| 0.7 | 0.8 | 0.7 |
| 0.7 | 0.8 | 0.7 |

| 0.7 | 0.7 | 0.7 |
|---|---|---|
| 0.8 | 0.9 | 0.8 |
| 0.7 | 0.7 | 0.7 |

| 0.7 | 0.7 | 0.7 |
|---|---|---|
| 0.8 | 0.8 | 0.8 |
| 0.7 | 0.7 | 0.7 |

VIDEO PROCESSING METHOD AND APPARATUS, VIDEO PROCESSING PROGRAM, AND STORAGE MEDIUM WHICH STORES THE PROGRAM

TECHNICAL FIELD

The present invention relates to a video processing method and a corresponding apparatus, used for performing a simplified filtering operation which is adaptively applied to images which form a video image, and also relates to a video processing program used for implementing the video processing method, and a computer-readable storage medium which stores the program.

Priority is claimed on Japanese Patent Application No. 2006-353610, filed Dec. 28, 2006, the contents of which are incorporated herein by reference.

BACKGROUND ART

It is known that a prefilter, which is often used in a preprocess of video encoding, is effective for reducing block distortion, mosquito noise, or the like, accompanied with encoding, thereby improving the subjective image quality. The pass bandwidth (called "bandwidth" below) of the used prefilter is limited, so as to reduce noise included in an original image and improve the encoding efficiency. However, if the bandwidth is narrowed too much, the image quality is extremely degraded.

FIG. 23 shows an image processing method including a band limitation.

As shown in FIG. 23, in the image processing method including the band limitation, first, original image data B(1) is input, and is then converted into a frequency component 41) (see step S1000). The frequency component I(1) is subjected to a band limitation using a bandwidth r1 (0<r1<1), so that a frequency component I(r1) is obtained (see step S1100). The frequency component I(r1) is subjected to image transformation, thereby generating filtered image data B(r1) (see step S1200).

When such image processing is applied to all frames of a video image by using the same bandwidth, image quality of each filtered frame is not equal because each frame has the individual frequency characteristics of the image. That is, an image having a large amount of low-frequency components has only a small difference from the original image, and thus degradation in the subjective and objective image qualities is small. However, in an image having a large amount of high-frequency components, edges or the like are smoothed and blurred, which extremely degrades subjective and objective image qualities.

As an objective image estimation value, for example, a PSNR (Peak Signal to Noise Ratio) is often used. With given signal level (S) and noise level (N), the PSNR is indicated by the following formula:

$$PSNR = 20 \times \log_{10}(S/N)$$

In actual processing, if brightness of an original image is represented by 8 bit (i.e., 0 to 255), the PSNR can be computed by the following formula:

$$PSNR = 20\log_{10}\left[255 \Big/ \frac{1}{N}\sqrt{\sum_{x=0}^{N-1}\sum_{y=0}^{N-1}\{f(x,y)-f'(x,y)\}^2}\right]$$

where N indicates the number of pixels of the original image and a filtered image thereof; f(x,y) indicates each pixel value of the original image; and f'(x,y) indicates each pixel value of the filtered image. Additionally, "255" indicates the maximum amplitude (or pixel value) of the pixels of both images.

That is, in actual processing, the original image and the filtered image thereof are compared with each other (specifically by using the above formula), so as to compute the PSNR.

In a method for solving the above-described problem, subjective and objective image quality control is performed by means of a "round-robin" band limitation applied to each image.

FIG. 24 shows the structure of an optimum filtered image generating apparatus 100 for generating optimum filtered image data by performing a "round-robin" band limitation.

As shown in FIG. 24, the optimum filtered image generating apparatus 1000 includes an original image data input unit 1100, a frequency component analyzing unit 1200, a bandwidth manual selecting unit 1300, a band limitation unit 1400, an image data generating unit 1500, a PSNR computing unit 1600, an image judgment unit 1700, and an optimum band-limited image data output unit 1800.

FIG. 25 shows an image processing method of generating optimum filtered image data by performing a "round-robin" band limitation, where the method is executed in the optimum filtered image generating apparatus 1000 having the above structure.

In the optimum filtered image generating apparatus 1000, first, original image data B(1) is input into the original image data input unit 1100, and is then converted into a frequency component 41) in the frequency component analyzing unit 1200 (see step S2000).

Next, in the bandwidth manual selecting unit 1300, a provisional bandwidth r1 is manually selected (see step S2100). Then, in the band limitation unit 1400, the converted frequency component I(1) is subjected to a band limitation using the selected bandwidth r1, so as to obtain a frequency component I(r1) (see step S2200).

Next, in the image data generating unit 1500, the frequency component I(r1) is subjected to an image transformation, thereby generating image data B(r1) (see step S2300). In the PSNR computing unit 1600, the original image data B(1) is compared with the image data B(r1), so as to compute RSNR (r1) (indicated by "P(r1)" below) (see step S2400).

In the image judgment unit 1700, it is determined whether or not the computed P(r1) has a desired image quality (see step S2500). If it has the desired image quality, the optimum band-limited image data output unit 1800 outputs the image data B(r1) as optimum band-limited image data (i.e., optimum filtered image data) (see step S2600).

However, it is rare that P(r1) obtained in the first processing turn has a desired image quality. When it does not have the desired image quality, the operation returns to the process (in step S2100) performed by the bandwidth manual selecting unit 1300, and a bandwidth (r2) is selected again so that the relevant band-limited image has a quality closer to the desired image quality. Then, band limitation, image generation, and PSNR computation are again performed similarly.

That is, the above-described operation is repeated N times until the desired image quality is obtained, and a bandwidth rN, which is obtained finally, is used as an optimum bandwidth for generating image data B(rN) by the optimum band-limited image data output unit 1800. The generated image data B(rN) is output as optimum band-limited image data (i.e., optimum filtered image data) (see step S2600).

However, in the above method, various video images and all frames which form thereof are subjected to filtering, the subjective or objective image quality of each obtained image signal is estimated, and the relevant operation is repeated in a "round-robin" manner until an equal image quality is obtained for all frames of the video images. In consideration of the required time and cost, when many images are processed, the above method is inappropriate and impracticable.

In order to solve the above problem, in a known technique (see Patent Document 1), image processing is performed by obtaining an optimum bandwidth based on the encoding data of a (video) image.

FIG. 26 shows the structure of an optimum filtered image generating apparatus 2000 for generating optimum filtered image data by using encoding data.

As shown in FIG. 26, the optimum filtered image generating apparatus 2000 includes an original image data input unit 2100, a frequency component analyzing unit 2200, an image data encoding unit 2300, an optimum limited bandwidth determination unit 2400, a band limitation unit 2500, an image data generating unit 2600, and an optimum band-limited image data output unit 2700.

FIG. 27 shows an image processing method of generating optimum filtered image data by using encoding data, where the method is executed in the optimum filtered image generating apparatus 2000 having the above structure.

In the optimum filtered image generating apparatus 2000, first, original image data B(1) is input into the original image data input unit 2100, and is then converted into a frequency component 41) in the frequency component analyzing unit 2200 (see step S3000).

Next, in the image data encoding unit 2300, the input original image data B(1) is encoded (see step S3100). Based on the information for the amount of code obtained by the relevant encoding, an optimum bandwidth r1 is determined in the optimum limited bandwidth determination unit 2400 (see step S3200).

In the band limitation unit 2500, the converted frequency component 41) is subjected to a band limitation using the determined bandwidth r1, so as to obtain a frequency component I(r1) (see step S3300). In the image data generating unit 2600, the frequency component I(r1) is subjected to an image transformation, thereby generating image data B(r1) (see step S3400).

Finally, the image data B(r1) is output as optimum band-limited image data (i.e., optimum filtered image data) from the optimum band-limited image data output unit 2700 (see step S3500).

Accordingly, in the conventional optimum filtered image generating apparatus 2000 formed as shown in FIG. 26, after encoding is performed, an optimum bandwidth is determined based on encoding data obtained by the encoding. Therefore, optimum filtered image data is obtained without performing a repetitive operation as required in the optimum filtered image generating apparatus 1000 fowled as shown in FIG. 24.

Patent Document 1: Japanese Unexamined Patent Application, First Publication No. H06-225276.

DISCLOSURE OF INVENTION

Problem to be Solved by the Invention

Certainly, in accordance with the conventional optimum filtered image generating apparatus 2000 formed as shown in FIG. 26, optimum filtered image data can be generated without performing a repetitive operation as required in the optimum filtered image generating apparatus 1000 formed as shown in FIG. 24.

However, in the optimum filtered image generating apparatus 2000 of FIG. 26, after encoding is performed, the optimum bandwidth is determined based on encoding information obtained by the encoding.

In such a method using encoding data, a band limitation process and an encoding process are inseparable. Therefore, even if the user would like to perform only a prefiltering process using the optimum bandwidth, encoding is also necessary. If encoding is also performed after the prefiltering process, encoding would be performed twice. In particular, if the image size is large, considerable processing time is required.

In consideration of the above, in order to optimize the bandwidth for the prefilter, it is preferable to employ a method which can simplify the relevant processing and can be voluntarily controlled using a standard for estimating the subjective or objective image quality, in comparison with a method using encoding data (e.g., the amount of code).

In light of the above circumstances, an object of the present invention is to provide a novel image processing technique, by which an adaptive filtering process for images which form a video image can be implemented with no encoding process and no repetitive operation, and in consideration of a frequency distribution in a frame or between frames of the images, thereby efficiently generating a filtered image having a specific image quality estimation value.

Means for Solving the Problem

A: First Structure

In order to achieve the above object, a video processing apparatus of the present invention includes: (1) a division device for dividing a processing target image, which forms a video image, into a plurality of divided areas; (2) a first bandwidth determination device for determining a first bandwidth applied to the divided areas divided by the division device; (3) a first filter coefficient array computing device for computing a first filter coefficient array for implementing frequency characteristics corresponding to a band limitation using the first bandwidth determined by the first bandwidth determination device; (4) a filtered divided image data generation device for generating filtered divided image data of each divided area (divided by the division device) by subjecting image data of each divided area (divided by the division device) to a filtering process using the first filter coefficient array computed by the first filter coefficient array computing device; (5) an allocation coefficient computing device for deriving, for each divided area, a value of error information between the image data of each divided area and the filtered divided image data generated by the filtered divided image data generation device, and computing an allocation coefficient used for determining an optimum bandwidth, based on the derived value; (6) an optimum bandwidth determination device for determining, for each divided area divided by the division device, the optimum bandwidth corresponding to the allocation coefficient computed by the allocation coefficient computing device; (7) an optimum filter coefficient array computing device for computing, for each divided area divided by the division device, an optimum filter coefficient array for implementing the frequency characteristics corresponding to a band limitation using the optimum bandwidth determined by the optimum bandwidth determination device; (8) an optimum filtered divided image data generation device for generating optimum filtered divided image data of each divided area (divided by the division device) by subjecting the image data of each divided area to a filtering process using the optimum filter coefficient array computed by the optimum filter coefficient array computing device; and (9) a synthesizing device for synthesizing the optimum filtered divided image data of each divided area, which has been generated by the optimum filtered divided image data generation device.

The above structure may further include:

a comparison device for comparing, for each divided area, the optimum bandwidth determined by the optimum bandwidth determination device with an optimum bandwidth of a peripheral divided area around the present divided area; and a correction device for correcting the optimum bandwidth determined by the optimum bandwidth determination device, based on a result of the comparison.

The above structure may further include:

a determination device for determining whether or not the image data of each divided area has a motion by using image data of a frame before or after the frame of the area, or image data of frames before and after the frame of the area; and a correction device for correcting the optimum bandwidth (determined by the optimum bandwidth determination device) of each divided area for which it is determined by the determination device that the image data of the divided area has a motion.

In this case, it is possible that:

the determination device determines whether or not the image data of the divided area has a motion and is characterized by a high-frequency component; and the optimum bandwidth correction device corrects the determined optimum bandwidth of each divided area for which it is determined that the image data thereof has a motion and is characterized by a high-frequency component.

A video processing method of the present invention, which is implemented when the above devices operate, can also be implemented by a computer program. Such a computer program may be provided by storing it in an appropriate computer-readable storage medium, or by means of a network, and can be installed and operate on a control device such as a CPU so as to implement the present invention.

B: Second Structure

In order to achieve the above object, another video processing apparatus of the present invention includes: (1) a first bandwidth determination device for determining a first bandwidth applied to the divided area size of divided areas which are set on a processing target image which forms a video image, so as to section the processing target image; (2) a first filter coefficient array computing device for computing a first filter coefficient array for implementing frequency characteristics corresponding to a band limitation using the first bandwidth determined by the first bandwidth determination device; (3) a filtered image data generation device for generating filtered image data by subjecting image data of the processing target image to a filtering process using the first filter coefficient array computed by the first filter coefficient array computing device; (4) an allocation coefficient computing device for deriving, for each divided area, a value of error information between the image data of the processing target image and the filtered image data generated by the filtered image data generation device, and computing an allocation coefficient used for determining an optimum bandwidth, based on the derived value; (5) an optimum bandwidth determination device for determining, for each divided area, the optimum bandwidth corresponding to the allocation coefficient computed by the allocation coefficient computing device; (6) an optimum filter coefficient array computing device for computing, for each divided area, an optimum filter coefficient array for implementing the frequency characteristics corresponding to a band limitation using the optimum bandwidth determined by the optimum bandwidth determination device; (7) an optimum filtered divided image data generation device for generating optimum filtered divided image data of each divided area by subjecting the image data of each divided area to a filtering process using the optimum filter coefficient array computed by the optimum filter coefficient array computing device; and (8) a synthesizing device for synthesizing the optimum filtered divided image data of each divided area, which has been generated by the optimum filtered divided image data generation device.

The above structure may further include:

a comparison device for comparing, for each divided area, the optimum bandwidth determined by the optimum bandwidth determination device with an optimum bandwidth of a peripheral divided area around the present divided area; and a correction device for correcting the optimum bandwidth determined by the optimum bandwidth determination device, based on a result of the comparison.

The above structure may further include:

a determination device for determining whether or not the image data of each divided area has a motion by using image data of a frame before or after the frame of the area, or image data of frames before and after the frame of the area; and a correction device for correcting the optimum bandwidth (determined by the optimum bandwidth determination device) of each divided area for which it is determined by the determination device that the image data of the divided area has a motion.

In this case, it is possible that:

the determination device determines whether or not the image data of the divided area has a motion and is characterized by a high-frequency component; and the optimum bandwidth correction device corrects the determined optimum bandwidth of each divided area for which it is determined that the image data thereof has a motion and is characterized by a high-frequency component.

A video processing method of the present invention, which is implemented when the above devices operate, can also be implemented by a computer program. Such a computer program may be provided by storing it in an appropriate computer-readable storage medium, or by means of a network, and can be installed and operate on a control device such as a CPU so as to implement the present invention.

C: Processing of the Present Invention

In the video processing apparatus having the first structure of the present invention, when a processing target image, which forms a video image, is input, it is divided into a plurality of divided areas. The first bandwidth applied to the divided areas is determined, for example, based on the size of each divided area.

Next, a first filter coefficient array for implementing frequency characteristics corresponding to a band limitation using the first bandwidth is computed, and filtered divided image data of each divided area is generated by subjecting image data of each divided area to a filtering process using the computed first filter coefficient array.

Next, for each divided area, a value (e.g., a PSNR) of error information between the image data of each divided area and the generated filtered divided image data is derived, and an allocation coefficient used for determining an optimum bandwidth is computed based on the derived value.

For example, the allocation coefficient is computed by dividing a value of error information, which is obtained in a state extremely close to a state that performs no band limitation, by the derived value of error information.

On the other hand, in the video processing apparatus having the second structure of the present invention, when a processing target image which forms a video image is input, a first bandwidth may be determined based on the divided area size of divided areas which are set on the processing target image so as to section the processing target image, thereby determining the first bandwidth applied to the divided areas.

Next, a first filter coefficient array for implementing frequency characteristics corresponding to a band limitation using the first bandwidth is computed, and filtered image data is generated by subjecting image data of the processing target image to a filtering process using the computed first filter coefficient array.

Next, for each divided area, a value (e.g., a PSNR) of error information between the image data of the processing target image and the generated filtered image data is derived, and an allocation coefficient used for determining an optimum bandwidth is computed based on the derived value.

For example, the allocation coefficient is computed by dividing a value of error information, which is obtained in a state extremely close to a state that performs no band limitation, by the derived value of error information.

After the allocation coefficient is computed for each divided area as described above, the same processing is performed in the first and second structures.

That is, next, the optimum bandwidth corresponding to the computed allocation coefficient is determined for each divided area, for example, by referring to an optimum bandwidth determination table in which a correspondence relationship between the allocation coefficient and the optimum bandwidth is defined.

In this case, when a plurality of the optimum bandwidth determination tables are provided in correspondence to the image size and a target value of the error information, the optimum bandwidth determination table, which corresponds to the size of the divided area and a designated target value of the error information, is selected, and the optimum bandwidth corresponding to the allocation coefficient is determined by referring to the selected optimum bandwidth determination table.

Next, for each divided area, an optimum filter coefficient array for implementing the frequency characteristics corresponding to a band limitation using the determined optimum bandwidth is computed, and optimum filtered divided image data of each divided area is generated by subjecting the image data of each divided area to a filtering process using the computed optimum filter coefficient array.

In the last step, the generated optimum filtered divided image data is synthesized, thereby generating a filtered image of the processing target image.

In accordance with the above invention, a filtering process for converting a processing target image into an image having a specific image quality estimation value can be automatically performed with no encoding process and no repetitive operation.

In the present invention having the above structures, each divided area is subjected to a filtering process using an optimum filter coefficient array computed for the divided area. Therefore, the final filtered image generated for the processing target image may include noises at area boundaries.

Therefore, in an example, the optimum bandwidth determined for each divided area is compared with an optimum bandwidth of a peripheral divided area around the present divided area, and if there is a large difference therebetween, the determined optimum bandwidth is corrected so as to reduce the difference.

For the optimum bandwidth of each divided area determined in the present invention, when the divided area is an image part where a motion is observed, even if the optimum bandwidth is reduced (which can reduce the amount of code), image data of the divided area can still have an equal subjective image quality in comparison with other divided areas although the objective image quality thereof is not equal to those of other divided areas.

In consideration of the above, it is possible to:

determine whether or not the image data of each divided area has a motion by using image data of a frame before or after the frame of the area, or image data of frames before and after the frame of the area (e.g., by estimating a variation in pixel values for such a frame and the present frame); and correct the determined optimum bandwidth of each divided area for which it is determined that the image data of the divided area has a motion, so that the optimum bandwidth is reduced.

Also for the optimum bandwidth of each divided area determined in the present invention, when the divided area is an image part which has a motion and is characterized by a high-frequency component, even if the optimum bandwidth is considerably reduced (which can considerably reduce the amount of code), image data of the divided area can still have an equal subjective image quality in comparison with other divided areas although the objective image quality thereof is not equal to those of other divided areas.

In consideration of the above, it is possible to:

determine whether or not the image data of each divided area has a motion and is characterized by a high-frequency component by using image data of a frame before or after the frame of the area, or image data of frames before and after the frame of the area (e.g., by determining whether or not a value which indicates the attribute of image data of the divided area shows that the image data is characterized by a high-frequency component, and simultaneously estimating a variation in the number of divided areas, which show that the relevant image data is characterized by a high-frequency component, for such a frame (used for the determination) and the present frame); and correct the determined optimum bandwidth of each divided area for which it is determined that the image data of the divided area has a motion and is characterized by a high-frequency component, so that the optimum bandwidth is reduced.

Accordingly, even when an image as a constituent of a video image has both an image part which includes many high-frequency components and an image part which does not include many high-frequency components, optimum filtered image data for implementing a target value of error information (e.g., a target PSNR) can be generated for each image part.

Effect of the Invention

In accordance with the present invention, an adaptive filtering process for images which form a video image can be implemented with no encoding process and no repetitive operation, and in consideration of a frequency distribution in a frame or between frames of the images, thereby efficiently generating a filtered image having a specific image quality estimation value.

BRIEF DESCRIPTION OF THE DRAWINGS

FIG. 3 is also a diagram used for explaining the optimum bandwidth determination table.

FIG. 5A is a diagram used for explaining the first bandwidth determination table.

FIG. 5B is also a diagram used for explaining the first bandwidth determination table.

Figure 1:
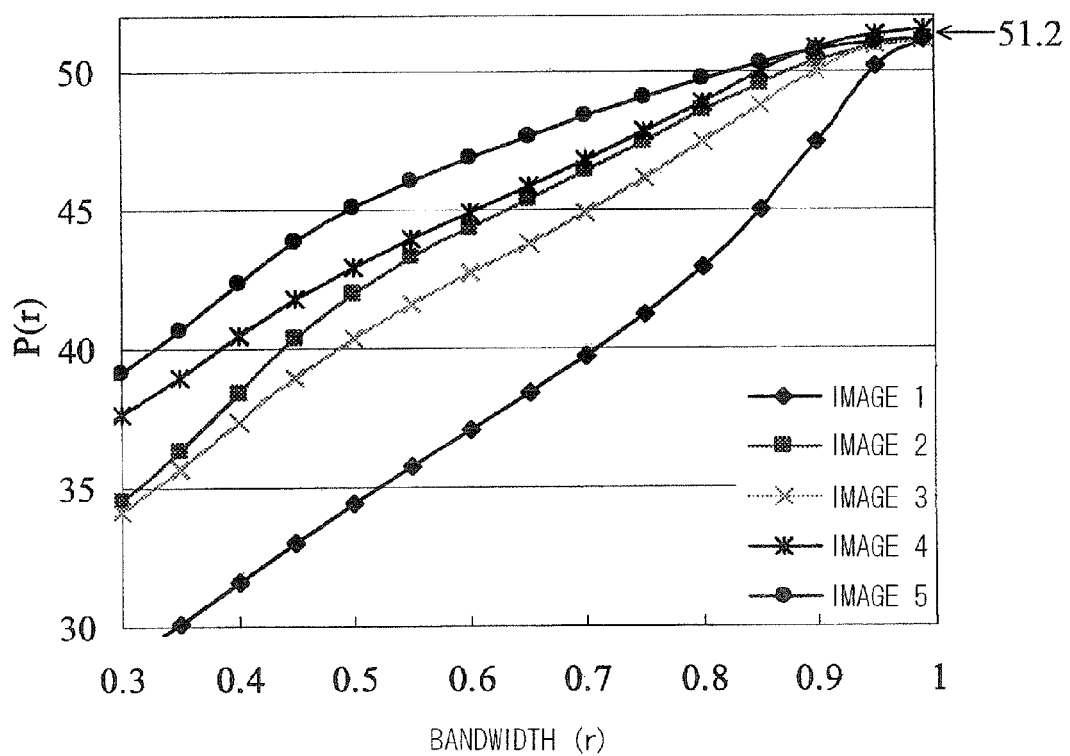
FIG. 1 is a diagram used for explaining the results of experiments for obtaining correspondence relationships between the bandwidth and the PSNR.

| Reference Symbols | |
|---|---|
| 1 | optimum filtered image generating apparatus |
| 100 | original image data input unit |
| 101 | image division unit |
| 102 | first bandwidth determination unit |
| 103 | first bandwidth determination table |
| 104 | first filter coefficient array computing unit |
| 105 | filtered image data generation unit |
| 106 | allocation coefficient computing unit |
| 107 | optimum bandwidth determination table selection unit |
| 108 | optimum bandwidth determination table |
| 109 | optimum bandwidth determination unit |
| 110 | optimum filter coefficient array computing unit |
| 111 | filtered image data generation unit |
| 112 | data accumulation unit |
| 113 | filtered image data synthesizing unit |
| 200 | repetition part |

BEST MODE FOR CARRYING OUT THE INVENTION

In order to solve the above-described problems relating to the conventional techniques, the inventors of the present invention thought of an invention in which first, a provisional bandwidth is determined in accordance with the image size of the image data of a processing target, and based on the image size, provisional filtered image data is generated so as to measure an objective image quality estimation value. Then, a dimensionless parameter such as the allocation coefficient is computed based on the measured objective image quality estimation value, and an optimum bandwidth determination table is referred to by using the computed allocation coefficient as a key, so as to determine an optimum bandwidth for implementing a target objective image quality estimation value, where the optimum bandwidth determination table has a data conversion structure by which the larger the allocation coefficient of the image data, the larger the determined optimum bandwidth. Based on the optimum bandwidth, optimum filtered image data for the image data of the processing target is generated.

In accordance with the above invention, a filtering process for converting an original image into an image having a specific objective image quality estimation value can be automatically performed with no encoding process and no repetitive operation, so that the conventional problems can be solved.

In the above invention, one entire image is a target for the relevant filtering process.

However, one image has both a part which includes many high-frequency components and a part which does not include many high-frequency components. Therefore, when an entire image is subjected to a filtering process using a single filter coefficient array, image quality is considerably degraded in a part which includes many high-frequency components, and image quality is not so degraded in a part which does not include many high-frequency components.

In addition, the above invention is provided in consideration of a band limitation using an objective image quality index, but without consideration of a band limitation using a subjective image quality index. However, a band limitation using, not only an objective image quality index, but also a subjective image quality index may be preferable in consideration of the encoding efficiency.

That is, for a high-frequency component in an area where a motion is observed, such as a high-frequency component relating to a water discharge or a firework, or a high-frequency component produced due to a quick panning of the camera, no considerable visual degradation occurs in comparison with a high-frequency component in an area where no motion is observed.

Therefore, in order to further improve the encoding efficiency, it is preferable to perform a filtering process in which different objective image quality indexes are assigned to a high-frequency component of an area having a motion and a high-frequency component of an area having no motion (for the PSNR, a relatively lower PSNR is assigned to a high-frequency component of an area having a motion). That is, it is preferable to determine presence or absence of motion for each target high-frequency component and apply adaptive weighting to the high-frequency component, so as to set a bandwidth and perform the relevant filtering process.

In consideration of the above circumstances, the inventors of the present invention thought of the present invention by further improving the above invention which the inventors had thought of.

Next, the reason for that a filtering process for converting an image of a processing target into an image having a specific image quality estimation value can be automatically performed with no encoding process and no repetitive operation will be explained concretely.

For convenience of the following explanation while maintaining the generality of the explanation, no image division is considered, and the PSNR is used as error information.

FIG. 1 shows the results of experiments for obtaining relationships between the PSNR of each relevant image (see "P(r)" in FIG. 1) and the bandwidth r, where five different images 1 to 5 were used as images for the experiments, and filtering was applied to the image data (specifically, brightness components) by using a filter coefficient array for implementing the frequency characteristics corresponding to the equal bandwidth r (0.3<r<1) in both the horizontal and vertical directions. Here, each image has an image size of 1920× 1080 pixels.

As described above, in the present invention, a first bandwidth r1 is determined in the first step. For example, it is assumed that the first bandwidth r1 is set to 0.5.

In the next step of the present invention, filtered image data is generated using a first filter coefficient array for implementing frequency characteristics corresponding to a band limitation using r1=0.5, and the PSNR of the filtered image data is computed. Therefore, when processing the images 1 to 5 having characteristics shown in FIG. 1, filtered image data for the images is generated, and then P(0.5) as the PSNR of such first filtered image data is computed.

In accordance with the above computation, as shown in FIG. 1, P(0.5)=34.5 for image 1; P(0.5)=42.3 for image 2; P(0.5)=40.6 for image 3; P(0.5)=42.7 for image 4, and P(0.5) =45.3 for image 5.

In the next step of the present invention, an allocation coefficient X may be computed by dividing a PSNR value ("51.2" in FIG. 1), which is obtained in a state extremely close to a state that performs no band limitation, by each computed PSNR value.

In accordance with the above computation, a formula "X=51.2/P(r1)" is used so that: the allocation coefficient X=1.48 for image 1; the allocation coefficient X=1.21 for image 2; the allocation coefficient X=1.26 for image 3; the allocation coefficient X=1.20 for image 4; and the allocation coefficient X=1.13 for image 5.

In the next step of the present invention, a process of determining an optimum bandwidth corresponding to the computed allocation coefficient is performed. Although the determination process can be implemented using a program, specifically, a determination function of the program, it may be executed by referring to an optimum bandwidth determination table in which correspondence relationships between the allocation coefficient and the optimum bandwidth are defined.

Figure 2:
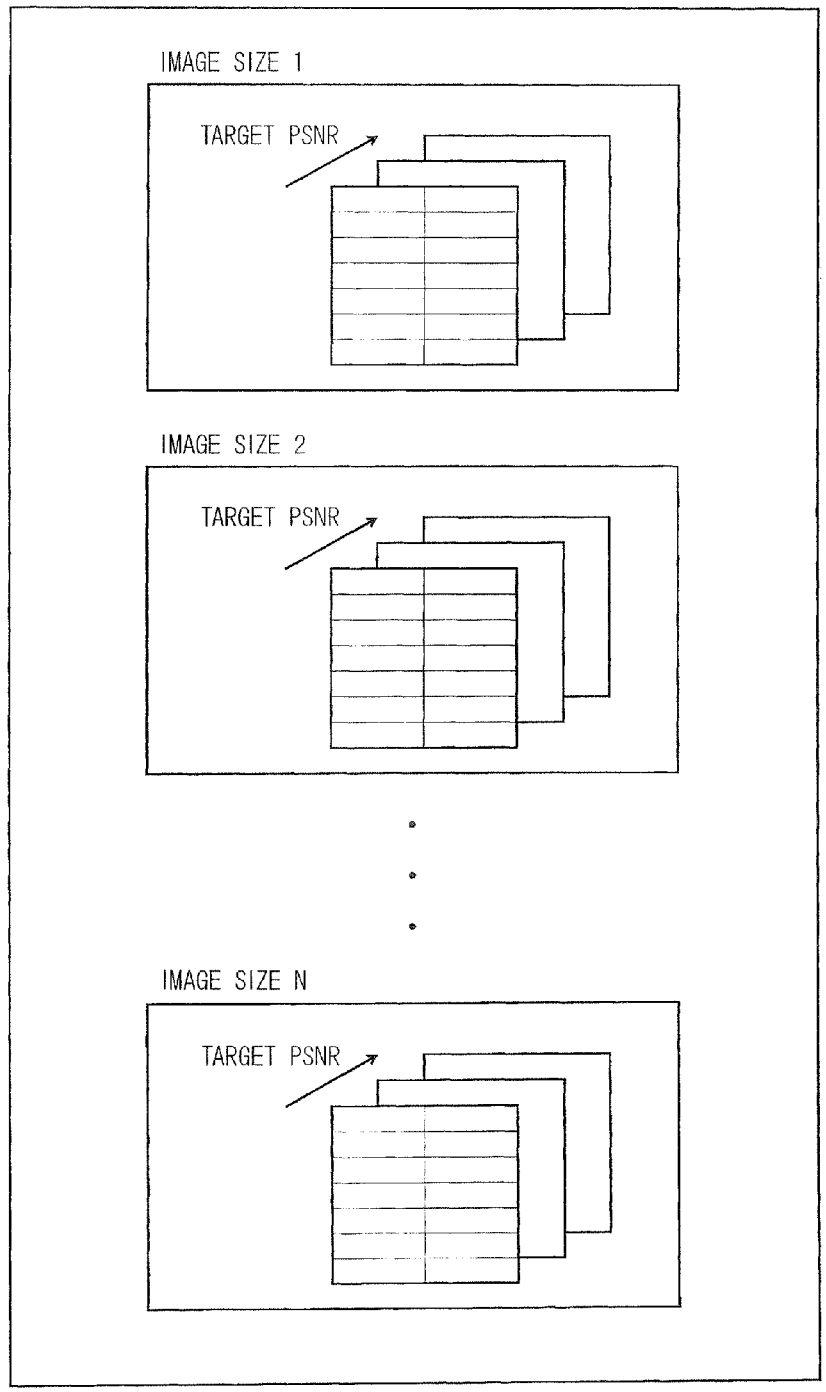
FIG. 2 is a diagram used for explaining the optimum bandwidth determination table.

For the optimum bandwidth determination table to be referred to, a plurality of tables may be prepared in association with the image size and the target PSNR (see FIG. 2). A table assigned to an image size and a target PSNR (see FIG. 3) manages information of the value of an optimum bandwidth r2 (used for implementing the target PSNR) assigned to each allocation coefficient X within a value range thereof.

For example, the correspondence relationship between the range of the allocation coefficient X and the optimum bandwidth r2 (used for implementing the target PSNR) is managed in a manner such that the optimum bandwidth r2 is: $B_1$ for each allocation coefficient X within a range of $X<A_1$; $B_2$ for each allocation coefficient X within a range of $A_1 \leq X<A_2$; and $B_3$ for each allocation coefficient X within the range of $A_2 \leq X<A_3$.

$A_i$ (i=1 to n−1) has the following relationship:

$$0<A_1<A_2<A_3<\ldots<A_{n-2}<A_{n-1}$$

In accordance with the setting such that the larger the allocation coefficient X, the larger the optimum bandwidth r2, the following relationship is also obtained:

$$0<B_1<B_2<B_3<\ldots<B_{n-2}<B_{n-1}<B_n<1$$

Accordingly, in the next step of the present invention, an optimum bandwidth determination table having the data structure as shown in FIG. 3 is referred to by using the computed allocation coefficient X as a key, so that the value $B_i$ is determined as the optimum bandwidth r2 in correspondence to the value of the allocation coefficient X.

As described above, the optimum bandwidth determination table has the following table structures:

$$0<A_1<A_2<A_3<\ldots<A_{n-2}<A_{n-1}$$

$$0<B_1<B_2<B_3<\ldots<B_{n-2}<B_{n-1}<B_n<1$$

Therefore, a larger optimum bandwidth r2 is assigned to image data having a larger allocation coefficient X, and a smaller optimum bandwidth r2 is assigned to image data having a smaller allocation coefficient X.

That is, as understood by the formula "X=51.2/P(r1)", image data having a larger allocation coefficient X has a smaller P(0.5); therefore, in order to implement the target PSNR, a larger optimum bandwidth r2 is required. In contrast, image data having a smaller allocation coefficient X has a larger P(0.5); therefore, in order to implement the target PSNR, a smaller optimum bandwidth r2 is required.

In consideration of the above, in order to indicate that a larger optimum bandwidth r2 is assigned to image data having a larger allocation coefficient X, and a smaller optimum bandwidth r2 is assigned to image data having a smaller allocation coefficient X, the optimum bandwidth determination table has the table structures:

$$0<A_1<A_2<A_3<\ldots<A_{n-2}<A_{n-1}$$

$$0<B_1<B_2<B_3<\ldots<B_{n-2}<B_{n-1}<B_n<1$$

The optimum bandwidth r2 as determined above is a bandwidth for generating the optimum filtered image data which implements the target PSNR.

Accordingly, in the next step of the present invention, an optimum filter coefficient array for implementing the frequency characteristics corresponding to the band limitation using the optimum bandwidth r2 is computed, and the relevant image data is subjected to a filtering process using the optimum filter coefficient array, that is, an adaptive filtering process in which a relatively wide bandwidth is assigned to image data which includes many high-frequency components and a relatively narrow bandwidth is assigned to image data which does not include many high-frequency components, thereby generating the optimum filtered image data for implementing the target PSNR.

In accordance with the present invention, the image data should be subjected to only two filtering processes, so as to generate optimum filtered image data for implementing the target PSNR.

Although the above explanation considers no image division, a processing target image is divided in the present invention, and each divided area is subjected to the above-described filtering process distinctive of the present invention.

Below, the present invention will be explained in detail in accordance with an embodiment.

(1) First Embodiment

Figure 4:
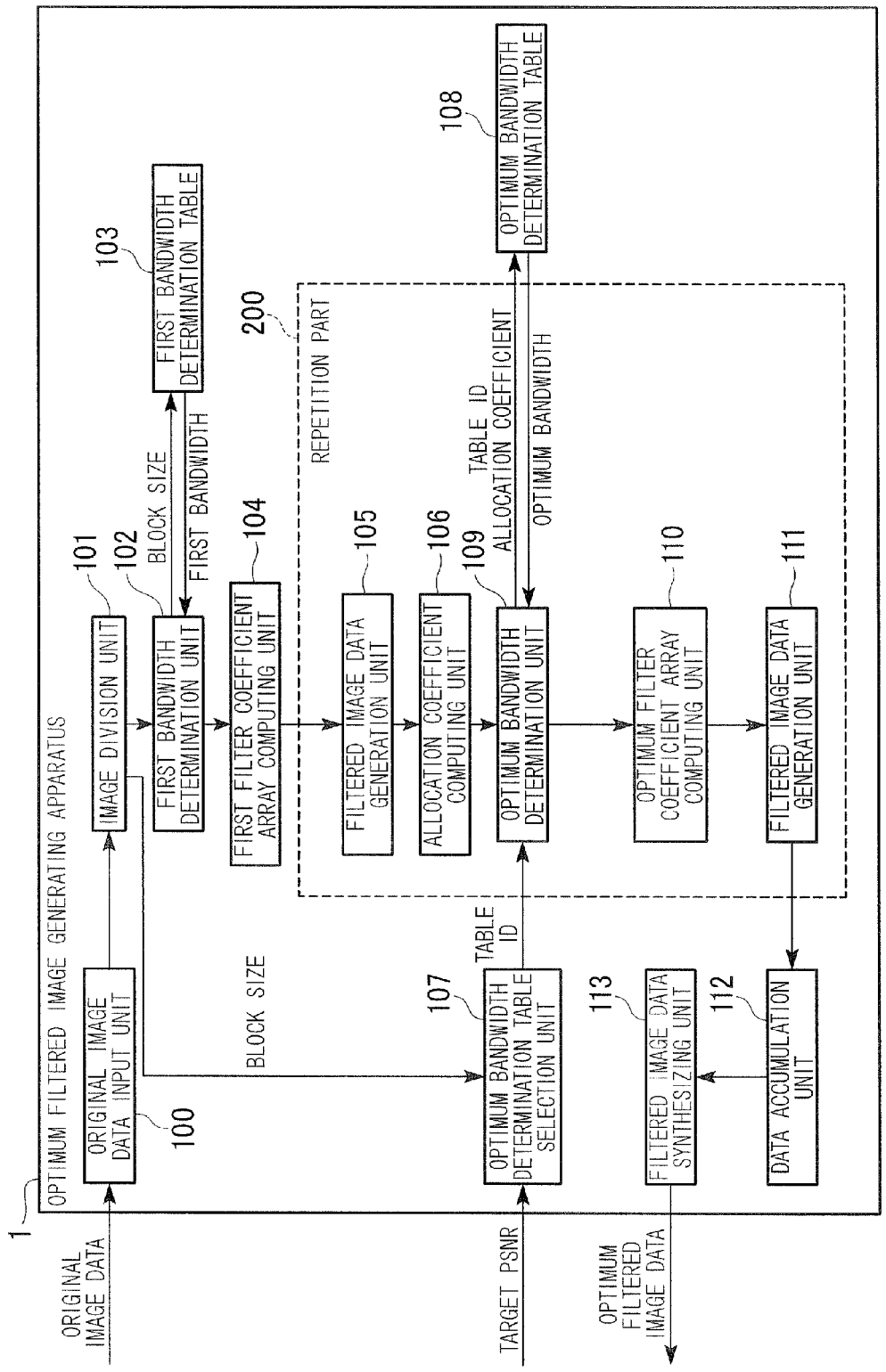
FIG. 4 is a diagram showing the structure of an optimum filtered image generating apparatus as a first embodiment of the present invention.

FIG. 4 shows an example of the structure of an optimum filtered image generating apparatus 1 as a first embodiment of the present invention.

As shown in FIG. 4, the optimum filtered image generating apparatus 1 as the first embodiment of the present invention has an original image data input unit 100, an image division unit 101, a first bandwidth determination unit 102, a first bandwidth determination table 103, a first filter coefficient array computing unit 104, a filtered image data generation unit 105, an allocation coefficient computing unit 106, an optimum bandwidth determination table selection unit 107, an optimum bandwidth determination table 108, an optimum bandwidth determination unit 109, an optimum filter coefficient array computing unit 110, a filtered image data generation unit 111, a data accumulation unit 112, and a filtered image data synthesizing unit 113.

Here, the filtered image data generation unit 105, the allocation coefficient computing unit 106, the optimum bandwidth determination unit 109, the optimum filter coefficient array computing unit 110, and the filtered image data generation unit 111 process each block image data B(1) generated by the image division unit 101, and thus form a repetition part 200.

The original image data input unit 100 inputs original image data B(1)_all, which is a processing target and forms a video image, into the apparatus.

Based on a block size D or a division number E, which is designated in advance, the image division unit 101 divides the image data input by the original image data input unit 100 to generate block image data B(1) of the original image. Although the shape of each block is not limited, a rectangle is assumed for convenience of the following explanation.

The first bandwidth determination unit 102 refers to the first bandwidth determination table 103, which has a table structure (see FIGS. 5A and 5B) for defining corresponding relationships between the block size D and the first bandwidth r1, by using the block size D of the block image data B(1) (generated by the image division unit 101) as a key, so as to determine the first bandwidth r 1 (for a first path) defined in correspondence to the block size D.

The first filter coefficient array computing unit 104 computes a first filter coefficient array for implementing the frequency characteristics corresponding to the band limitation using the first bandwidth r1 determined by the first bandwidth determination unit 102.

The filtered image data generation unit 105 subjects each block image data B(1) (generated by the image division unit 101) to a filtering process using the first filter coefficient array which is computed by the first filter coefficient array computing unit 104, so as to generate first filtered block image data B(r1).

The allocation coefficient computing unit 106 compares the first filtered block image data B(r1) with the block image data B(1), and measures P(r1), which is error information and a PSNR of the first filtered block image data B(r1). The allocation coefficient computing unit 106 computes the allocation coefficient X based on P(r1), by using the following formula:

$$X = G/P(r1)$$

where G is a constant which may be "51.2" shown in FIG. 1.

The optimum bandwidth determination table selection unit 107 selects one of the optimum bandwidth determination tables 108, which are provided in association with the block size D and the target PSNR, where the selected one has a table structure as shown in FIG. 3, and corresponds to the block size D of the block image data B(1) (generated by the image division unit 101) and the target PSNR which is designated by the user. The optimum bandwidth determination table selection unit 107 outputs an ID number assigned to the selected table.

Here, $A_i$ and $B_i$ defined in the optimum bandwidth determination table 108 has the following relationships:

$$0 < A_1 < A_2 < A_3 < \ldots < A_{n-2} < A_{n-1}$$

$$0 < B_1 < B_2 < B_3 < \ldots < B_{n-2} < B_{n-1} < B_n < 1$$

The optimum bandwidth determination unit 109 determines the optimum bandwidth r2 (for a second path) by referring to the optimum bandwidth determination table 108, which is selected by the optimum bandwidth determination table selection unit 107, by using the allocation coefficient X (computed by the allocation coefficient computing unit 106) as a key.

The optimum filter coefficient array computing unit 110 computes an optimum filter coefficient array for implementing the frequency characteristics corresponding to the band limitation using the optimum bandwidth r2, which is determined by the optimum bandwidth determination unit 109.

The filtered image data generation unit 111 subjects each block image data B(1) (generated by the image division unit 101) to a filtering process using the optimum filter coefficient array computed by the optimum filter coefficient array computing unit 110, so as to generate optimum filtered block image data B(r2) and store it into the data accumulation unit 112.

When all block image data B(1) generated by the image division unit 101 has been processed, all optimum filtered block image data B(r2) has been stored in the data accumulation unit 112. Accordingly, the filtered image data synthesizing unit 113 synthesizes the stored data, and generates optimum filtered image data B(r2)_all for the original image data input by the original image data input unit 100.

Figure 6:
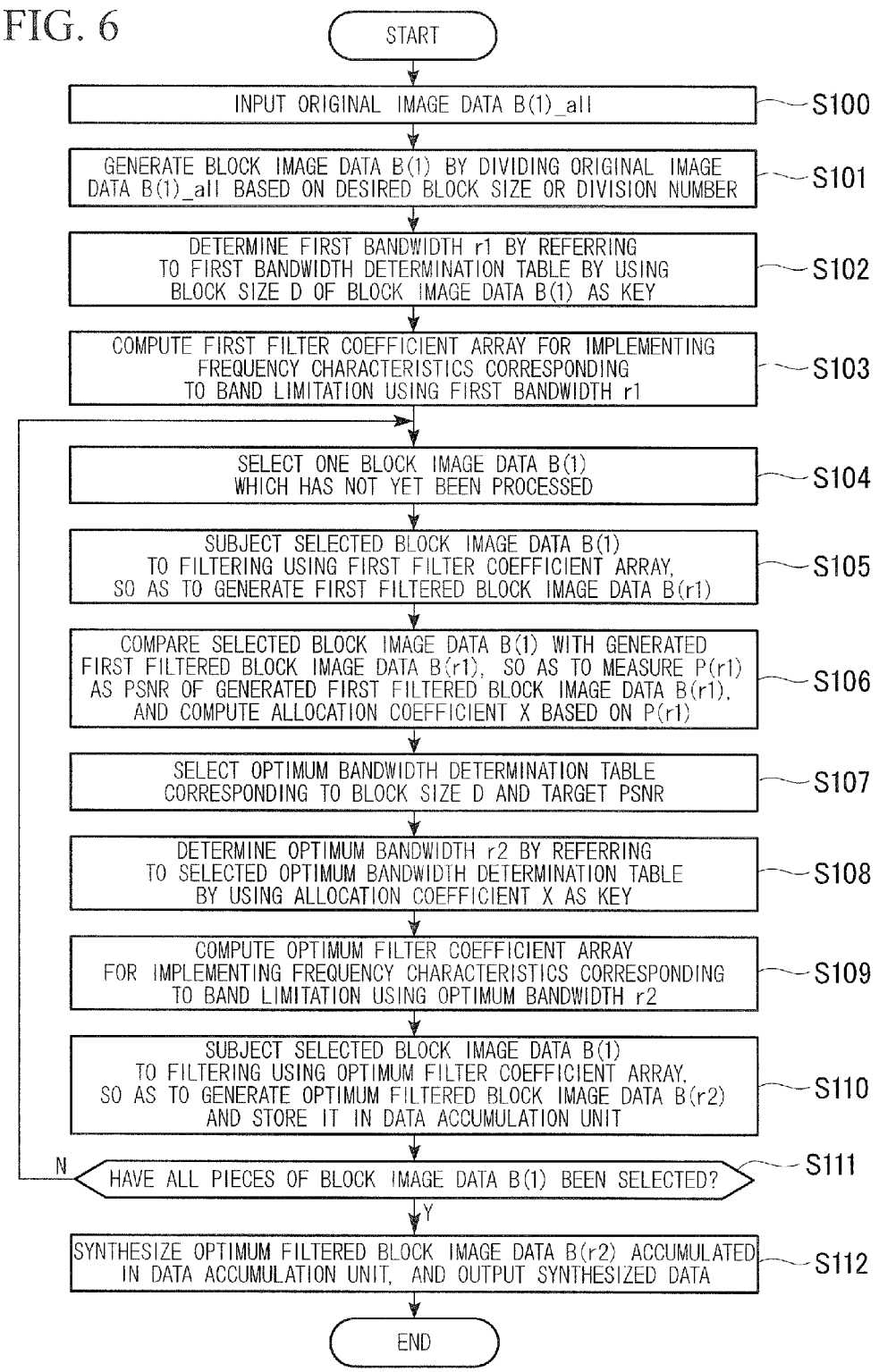
FIG. 6 shows a flowchart executed by the optimum filtered image generating apparatus of the first embodiment.

FIG. 6 shows a flowchart executed by the optimum filtered image generating apparatus 1 of the present embodiment, formed as described above.

In accordance with the flowchart, the processes performed by the optimum filtered image generating apparatus 1 will be explained in detail.

As shown in the flowchart of FIG. 6, when the optimum filtered image generating apparatus 1 receives a request for generating optimum filtered image data with respect to an image (which is a processing target and forms a video image), the original image data B(1)_all, for which the optimum filtered image data is generated, is input into the apparatus (see the first step S100).

In the next step S101, based on a block size D or a division number E, which is a desired value provided in advance, the input original image data B(1)_all is divided so as to generate block image data B(1) of the original image.

In the next step S102, the first bandwidth determination table 103, which has a table structure (see FIGS. 5A and 5B) for defining corresponding relationships between the block size D and the first bandwidth r1, is referred to by using the block size D of the block image data B(1) as a key, so as to determine the first bandwidth r1 (for the first path) defined in correspondence to the block size D.

If the block size D of the block image data B(1), which is handled in the optimum filtered image generating apparatus 1 of the present embodiment, is fixed to a predetermined size, no first bandwidth determination table 103 is necessary, and the first bandwidth r1, which is defined in advance in correspondence to the fixed size, is determined.

In the next step S103, the first filter coefficient array for implementing the frequency characteristics corresponding to the band limitation using the determined first bandwidth r1 is computed.

In the next step S104, one block image data B(1), which has not yet been processed, is selected, and in the following step S105, the selected block image data B(1) is subjected to a filtering process using the computed first filter coefficient array, so that first filtered block image data B(r1) is generated.

In the next step S106, the selected block image data B(1) is compared with the generated first filtered block image data B(r1), and P(r1) is measured which is error information and a PSNR of the generated first filtered block image data B(r1). The allocation coefficient X is then computed based on P(r1), by using the following formula:

$$X = G/P(r1) \quad \text{Formula (I)}$$

where G is a constant which may be "51.2" shown in FIG. 1.

In the next step S107, one of the optimum bandwidth determination tables 108 is selected, which are provided in association with the block size D and the target PSNR, where the selected one has a table structure as shown in FIG. 3, and corresponds to the block size D of the block image data B(1) and the target PSNR which is designated by the user.

The above selection of the optimum bandwidth determination table 108 may be performed in advance.

In addition, if the block size D of the original image data B(1), which is handled in the optimum filtered image generating apparatus 1 of the present embodiment, is fixed to a predetermined size, it is unnecessary to provide the optimum bandwidth determination tables 108 in association with the block size D and the target PSNR, and a plurality of the optimum bandwidth determination tables 108 in association with the values of the target PSNR are provided.

Additionally, if the block size D of the original image data B(1), which is handled in the optimum filtered image generating apparatus 1, is fixed to a predetermined size, and the target PSNR, which is handled in the optimum filtered image generating apparatus 1, is also fixed to a predetermined value, then it is unnecessary to provide the optimum bandwidth determination tables 108 in association with the block size D and the target PSNR, and a single optimum bandwidth determination table 108 is provided.

In the next step S108, the optimum bandwidth r2 (for the second path) is determined by referring to the selected optimum bandwidth determination table 108 by using the computed allocation coefficient X as a key.

In the next step S109, the optimum filter coefficient array for implementing the frequency characteristics corresponding to the band limitation using the determined optimum bandwidth r2 is computed.

In the next step S110, the selected block image data B(1) is again subjected to the filtering using the computed optimum filter coefficient array, so that the optimum filtered block image data B(r2) is generated and stored in the data accumulation unit 112.

In the next step S111, it is determined whether or not all pieces of the block image data B(1) have been selected. If it is determined that all pieces of the block image data B(1) have not yet been selected, the operation returns to step S104.

In contrast, if it is determined in step S111 that all pieces of the block image data B(1) have been selected, the operation proceeds to step S112. In step S112, all pieces of the optimum filtered block image data B(r2) are synthesized to generate and output the optimum filtered image data B(r2)_all having the same size as the original image data. The operation is then terminated.

Below, the above-described operation will be concretely explained.

Here, it is defined that the image size of the original image is 1920×1080; the block size D is 32×18; the division number E is 60 in both horizontal and vertical directions; Ptgt of the PSNR (i.e., target PSNR) is 36 dB; and G in Formula (1) is 51.2.

First, the first bandwidth determination process will be explained.

The block size D is input into the first bandwidth determination unit 102, and the first bandwidth r1 (e.g., 0.7) for the block size D is determined using the first bandwidth determination table 103 which is provided to the first bandwidth determination unit 102 in advance.

Then, first filtered block image data B(0.7) is generated using the first filter coefficient array for implementing the frequency characteristics corresponding to the band limitation with r1=0.7, and P(0.7), which is a PSNR of the first filtered block image data B(0.7), is measured. Then, the allocation coefficient X is computed using Formula (I).

Next, the optimum bandwidth determination process will be explained.

Values such as "D=32×18" and "Ptgt=36" are input into the optimum bandwidth determination table selection unit 107, and one of the optimum bandwidth determination tables 108, which are provided to the optimum bandwidth determination table selection unit 107 in advance, is selected, where the selected one corresponds to the input values and has a table structure as shown in FIG. 3.

Next, the optimum bandwidth r2 corresponding to the above computed allocation coefficient X is determined by referring to the selected optimum bandwidth determination table 108.

For example, if P(0.7)=45, then X=1.14 in accordance with Formula (1). Therefore, if "$A_{n-2} \leq 1.14 < A_{n-1}$", then the optimum bandwidth r2 is determined as $B_{n-1}$. Here, $A_i$ and $B_i$ respectively satisfy the following conditions.

$$0 < A_1 < A_2 < A_3 < \ldots < A_{n-2} < A_{n-1}$$

$$0 < B_1 < B_2 < B_3 < \ldots < B_{n-2} < B_{n-1} < B_n < 1$$

The optimum filtered block image data B(r2) is generated using an optimum filter coefficient array for implementing the frequency characteristics corresponding to the band limitation using the optimum bandwidth r2.

Such processes are repeated by a number of times corresponding to the division number, that is, applied to (60×60=)

3600 blocks. The 3600 pieces of the optimum filtered block image data B(r2) are finally synthesized, so that the optimum filtered image data is obtained as final output data.

In addition, a plurality of optimum bandwidth determination tables 108 corresponding to various Ptgt values may be prepared in advance so as to perform a filtering process for implementing voluntary image quality control by using the present invention.

As described above, in accordance with the first embodiment, it is possible to obtain blocks having almost equal PSNRs for any image, and thus to generate a filtered image by which image quality is uniform in each frame, and all areas in the frame have almost equal image quality.

(2) Second Embodiment

Figure 7:
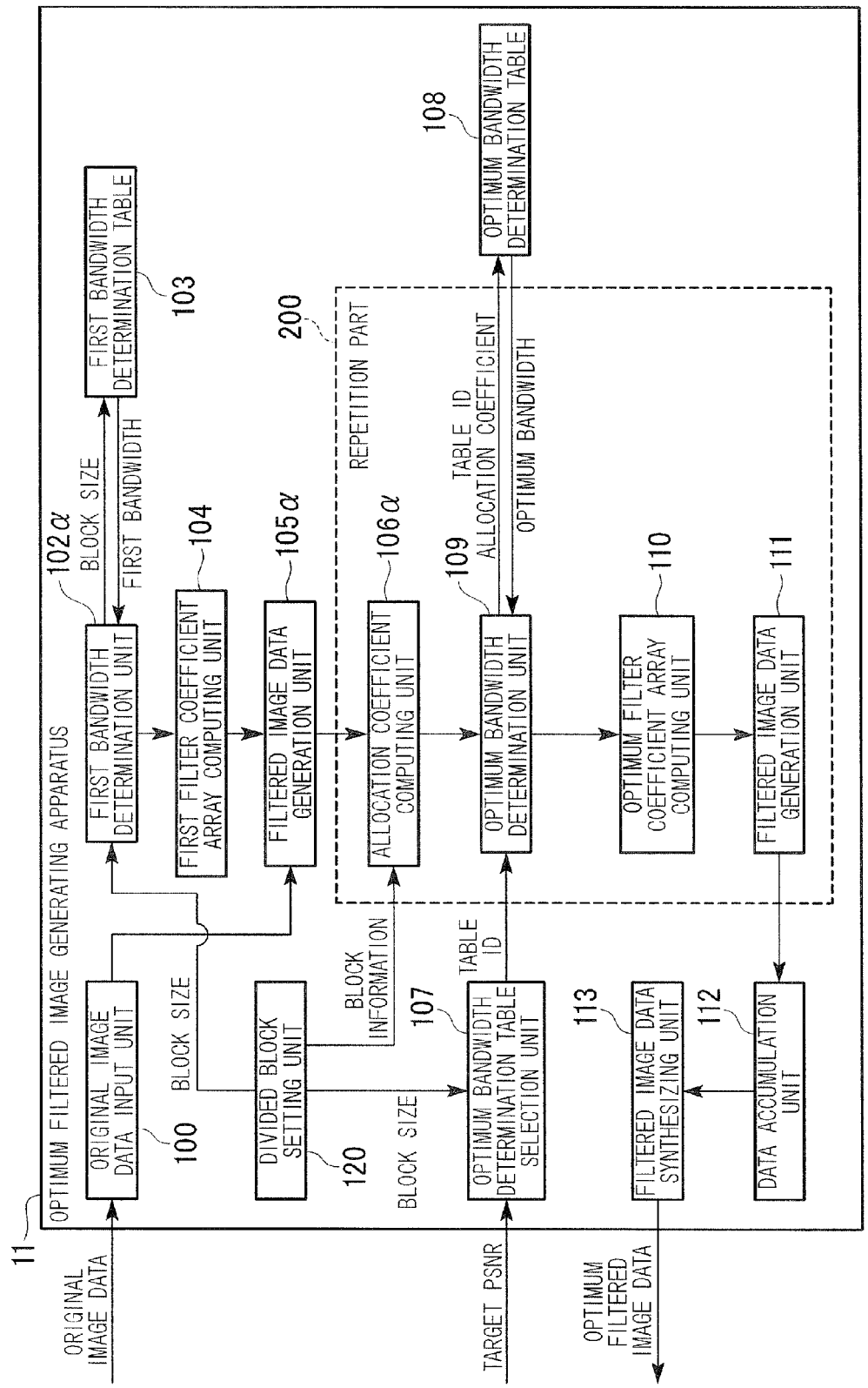
FIG. 7 is a diagram showing the structure of an optimum filtered image generating apparatus as a second embodiment of the present invention.

FIG. 7 shows an example of the structure of an optimum filtered image generating apparatus 11 as a second embodiment of the present invention.

In comparison with the optimum filtered image generating apparatus 1 (see FIG. 4) of the first embodiment, the optimum filtered image generating apparatus 11 of the second embodiment has no image division unit 101, but further includes a divided block setting unit 120. In addition, in the optimum filtered image generating apparatus 11, a first bandwidth determination unit 102a, a filtered image data generation unit 105a, and an allocation coefficient computing unit 106a respectively performs processes different from those of the first bandwidth determination unit 102, the filtered image data generation unit 105, and the allocation coefficient computing unit 106 in the optimum filtered image generating apparatus 1 of the first embodiment.

Based on a block size D or a division number E, which is designated in advance, the divided block setting unit 120 sets virtually divided blocks on original image data B(1)_all input by the original image data input unit 100. The image data of each virtually divided block corresponds to each block image data B(1) of the original image, which has been explained in the first embodiment.

The first bandwidth determination unit 102a refers to the first bandwidth determination table 103, which has a table structure (see FIGS. 5A and 5B) for defining corresponding relationships between the block size D and the first bandwidth r1, by using the block size D of the virtual blocks (set by the divided block setting unit 120) as a key, so as to determine the first bandwidth r1 (for a first path) defined in correspondence to the block size D.

The filtered image data generation unit 105a subjects the original image data B(1)_all (input by the original image data input unit 100) to a filtering process using the first filter coefficient array which is computed by the first filter coefficient array computing unit 104, so as to generate first filtered image data B(1)_all(r1).

For each virtual divided block set by the divided block setting unit 120, the allocation coefficient computing unit 106a compares an image data part, which belongs to the first filtered image data B(1)_all(r1) and is positioned on the relevant divided block, with an image data part, which belongs to the original image data B(1)_all and is positioned on the relevant divided block, and measures P(r1), which is error information and a PSNR of the image data part which belongs to the first filtered image data B(1)_all(r1) and is positioned on the relevant divided block. The allocation coefficient computing unit 106a computes the allocation coefficient X based on P(r1), by using the following formula:

$$X=G/P(r1)$$

Figure 8:
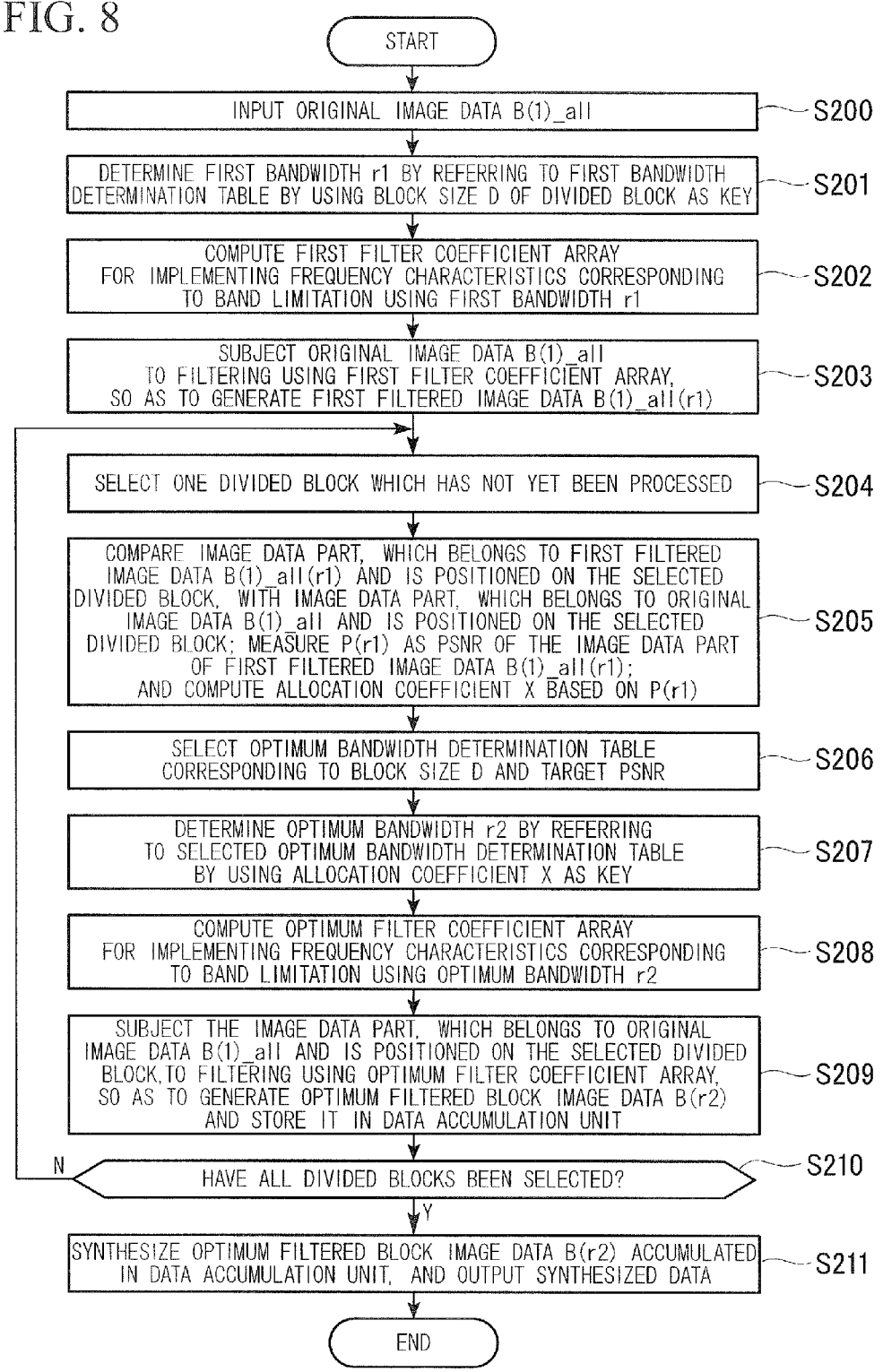
FIG. 8 shows a flowchart executed by the optimum filtered image generating apparatus of the second embodiment.

FIG. 8 shows a flowchart executed by the optimum filtered image generating apparatus 11 of the present embodiment, formed as described above.

In accordance with the flowchart, the processes performed by the optimum filtered image generating apparatus 11 will be explained in detail.

As shown in the flowchart of FIG. 8, when the optimum filtered image generating apparatus 11 receives a request for generating optimum filtered image data with respect to an image (which is a processing target and forms a video image), the original image data B(1)_all, for which the optimum filtered image data is generated, is input into the apparatus (see the first step S200).

In the next step S201, the first bandwidth determination table 103, which has a table structure (see FIGS. 5A and 5B) for defining corresponding relationships between the block size D and the first bandwidth r1, is referred to by using the block size D of the virtually-set divided blocks as a key, so as to determine the first bandwidth r1 (for the first path) defined in correspondence to the block size D.

In the next step S202, the first filter coefficient array for implementing the frequency characteristics corresponding to the band limitation using the determined first bandwidth r1 is computed.

In the next step S203, the input original image data B(1)_all is subjected to a filtering process using the computed first filter coefficient array, so that first filtered image data B(1)_all(r1) is generated.

In the next step S204, one divided block, which has not yet been processed, is selected from among the virtually-set divided blocks.

In the next step S205, an image data part, which belongs to the first filtered image data B(1)_all(r1) and is positioned on the selected divided block, is compared with an image data part, which belongs to the original image data B(1)_all and is positioned on the selected divided block, and P(r1) is measured which is a PSNR of the above image data part of the first filtered image data B(1)_all(r1). The allocation coefficient X is then computed based on P(r1), by using the following formula:

$$X=G/P(r1) \qquad \text{Formula (I)}$$

where G is a constant which may be "51.2" shown in FIG. 1.

In the next step S206, one of the optimum bandwidth determination tables 108 is selected, which are provided in association with the block size D and the target PSNR, where the selected one has a table structure as shown in FIG. 3, and corresponds to the block size D of the virtually-set divided blocks and the target PSNR which is designated by the user.

In the next step S207, the optimum bandwidth r2 (for the second path) is determined by referring to the selected optimum bandwidth determination table 108 by using the computed allocation coefficient X as a key.

In the next step S208, the optimum filter coefficient array for implementing the frequency characteristics corresponding to the band limitation using the determined optimum bandwidth r2 is computed.

In the next step S209, the image data part, which belongs to the original image data B(1)_all and is positioned on the selected divided block, is again subjected to the filtering using the computed optimum filter coefficient array, so that the optimum filtered block image data B(r2) is generated and stored in the data accumulation unit 112.

In the next step S210, it is determined whether or not all divided blocks have been selected. If it is determined that all divided blocks have not yet been selected, the operation returns to step S204.

In contrast, if it is determined in step S210 that all divided blocks have been selected, the operation proceeds to step S211. In step S211, all pieces of the optimum filtered block image data B(r2) are synthesized to generate and output the optimum filtered image data B(r2)_all having the same size as the original image data. The operation is then terminated.

In the structure shown in FIG. 7, the first filtered image data B(1)_all(r1) generated by the filtered image data generation unit 105α is virtually divided into blocks. However, such division may be actually performed.

As described above, similar to the first embodiment, it is also possible by the second embodiment to obtain blocks having almost equal PSNRs for any image, and thus to generate a filtered image by which image quality is uniform in each frame, and all areas in the frame have almost equal image quality.

(3) Third Embodiment

Figure 9:
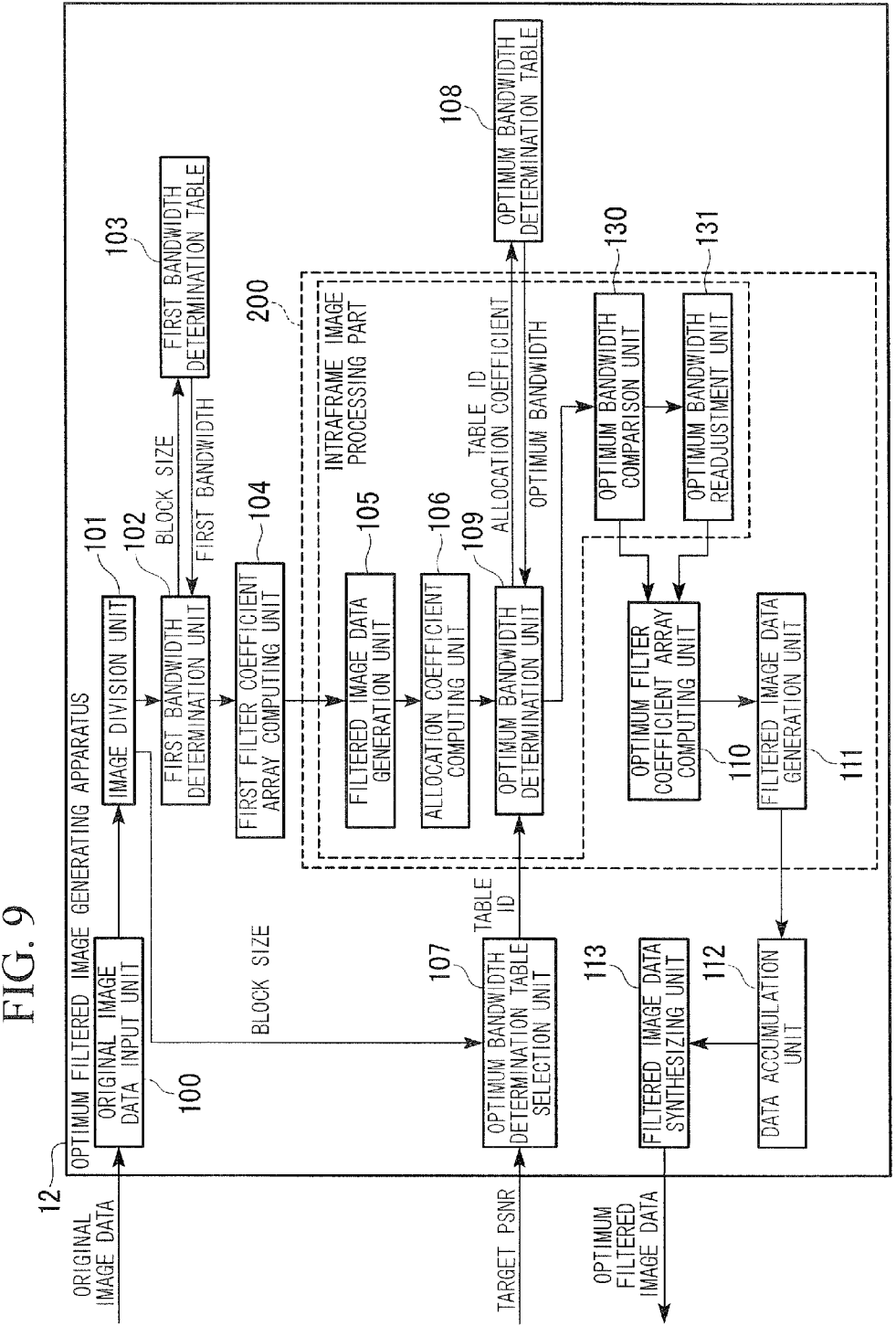
FIG. 9 is a diagram showing the structure of an optimum filtered image generating apparatus as a third embodiment of the present invention.

FIG. 9 shows an example of the structure of an optimum filtered image generating apparatus 12 as a third embodiment of the present invention.

In comparison with the optimum filtered image generating apparatus 1 (see FIG. 4) of the first embodiment, the optimum filtered image generating apparatus 12 of the third embodiment further includes an optimum bandwidth comparison unit 130 and an optimum bandwidth readjustment unit 131.

The optimum bandwidth comparison unit 130 compares the optimum bandwidth r2 (determined by the optimum bandwidth determination unit 109) of the block image data B(1) of the processing target block with the optimum bandwidth of the block image data B(1) of a peripheral block of the target block; computes the difference between the compared values; and determines whether or not the difference is greater than or equal to a predetermined threshold Sth1.

If the optimum bandwidth comparison unit 130 determines that the difference is greater than or equal to the threshold Sth1, the optimum bandwidth readjustment unit 131 readjusts the optimum bandwidth r2 determined by the optimum bandwidth determination unit 109 to r3 by which the difference reduces. In contrast, if it is determined that the difference is smaller than the threshold Sth1, the optimum bandwidth readjustment unit 131 determines that the optimum bandwidth r2 determined by the optimum bandwidth determination unit 109 is used unchanged.

Figure 10:
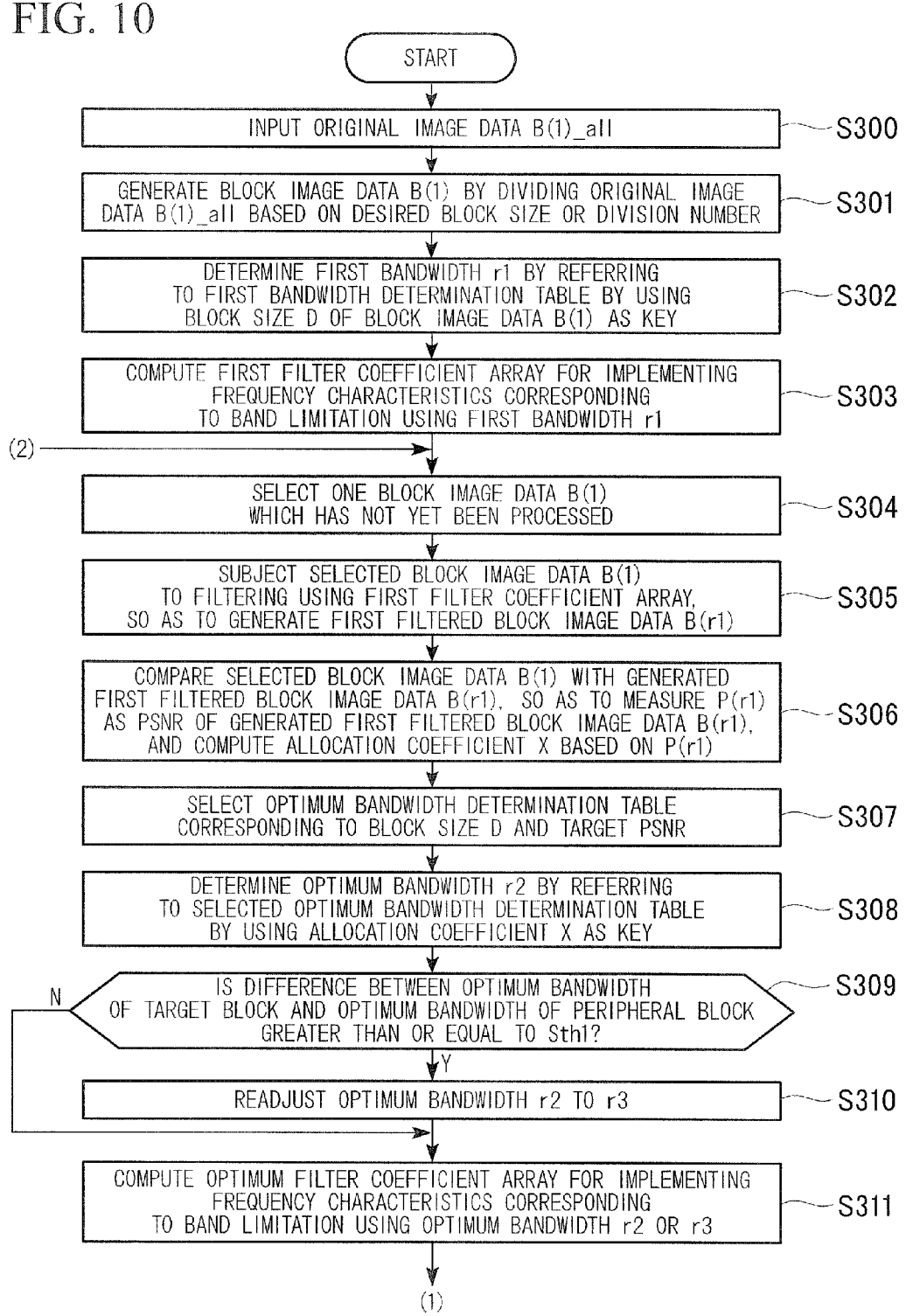
FIG. 10 shows a flowchart executed by the optimum filtered image generating apparatus of the third embodiment.
Figure 11:
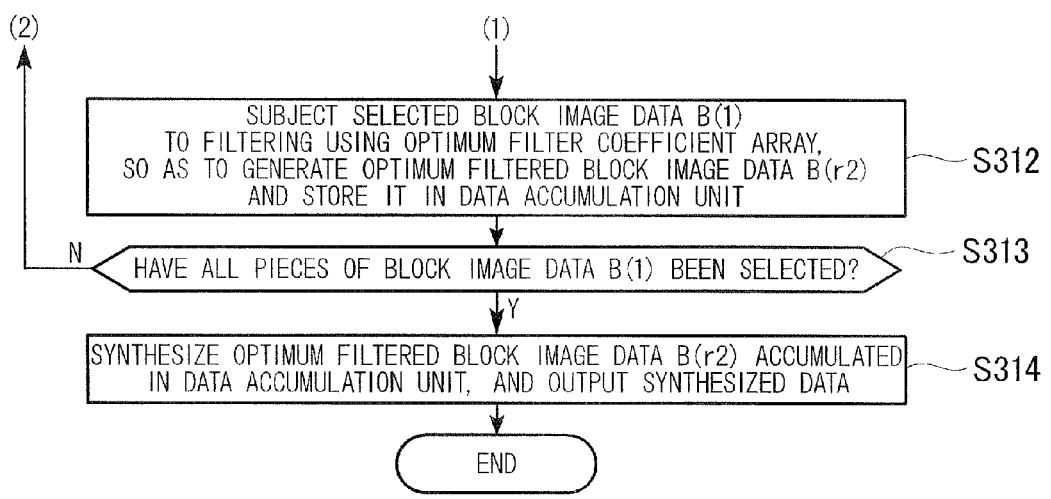
FIG. 11 also shows the flowchart executed by the optimum filtered image generating apparatus of the third embodiment.

FIGS. 10 and 11 show a flowchart executed by the optimum filtered image generating apparatus 12 of the present embodiment, formed as described above.

In accordance with the flowchart, the processes performed by the optimum filtered image generating apparatus 12 will be explained in detail.

When receiving a request for generating optimum filtered image data with respect to an image (which is a processing target and forms a video image), the optimum filtered image generating apparatus 12 executes the same processes (in steps S300 to 5308) as those in steps S100 to S108 of the flowchart in FIG. 6, so that the optimum bandwidth r2 (for the second path) for the selected block image data B(1) is determined.

In the next step S309, the optimum bandwidth r2 (determined in step S308) of the processing target block is compared with an already-computed optimum bandwidth of a block positioned around the target block; the difference between the compared values is computed; and it is determined whether or not the difference is greater than or equal to a predetermined threshold Sth1.

In accordance with the above determination, if it is determined that the difference between the optimum bandwidth r2 of the processing target block and the optimum bandwidth of the compared peripheral block is greater than or equal to the threshold Sth1, the operation proceeds to step S310, where the optimum bandwidth r2 determined in step S308 is readjusted to r3 by which the difference reduces.

In contrast, if it is determined that the difference between the optimum bandwidth r2 of the processing target block and the optimum bandwidth of the peripheral block is smaller than the threshold Sth1, the process of step S310 is not performed, and the optimum bandwidth r2 determined in step S308 is used unchanged.

In the following steps S311 to S314, the same processes as those in steps S109 to S112 of the flowchart in FIG. 6 are executed, so that the optimum filtered image data B(r2)_all having the same size as the original image data is generated and output.

FIGS. 12 to 15 show examples of the optimum bandwidth readjustment process performed by the optimum bandwidth readjustment unit 131.

Figure 12:
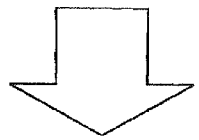
FIG. 12 is a diagram for explaining the optimum bandwidth readjustment process performed by the optimum bandwidth readjustment unit.
Figure 13:
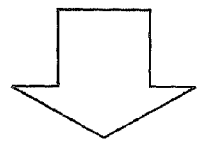
FIG. 13 is also a diagram for explaining the optimum bandwidth readjustment process performed by the optimum bandwidth readjustment unit.
Figure 14:
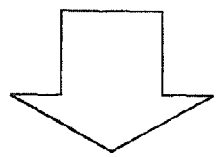
FIG. 14 is also a diagram for explaining the optimum bandwidth readjustment process performed by the optimum bandwidth readjustment unit.

If the center block among nine blocks, to which optimum bandwidths have been assigned by the optimum bandwidth determination unit 109, is a target for the readjustment, the optimum bandwidth readjustment unit 131 readjusts the optimum bandwidth (determined by the optimum bandwidth determination unit 109) as shown in FIGS. 12 to 14.

That is, as shown in FIG. 12, the optimum bandwidth may be readjusted to (i) a value equal to the values assigned to upper and lower blocks of the processing target block, (ii) an average of the values, or (iii) a value obtained by further adding $\pm\beta(0<\beta<1)$ to the readjusted value shown in the above item (i) or (ii).

Additionally, as shown in FIG. 13, the optimum bandwidth may be readjusted to (i) a value equal to the values assigned to right-side and left-side blocks of the processing target block, (ii) an average of the values, or (iii) a value obtained by further adding $\pm\beta$ $(0<\beta 3<1)$ to the readjusted value shown in the above item (i) or (ii).

Additionally, as shown in FIG. 14, the optimum bandwidth may be readjusted to (i) a value equal to the values assigned to blocks positioned diagonally with respect to the processing target block, (ii) an average of the values, or (iii) a value obtained by further adding $\pm\beta$ $(0<\beta<1)$ to the readjusted value shown in the above item (i) or (ii).

Figure 15:
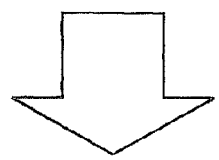
FIG. 15 is also a diagram for explaining the optimum bandwidth readjustment process performed by the optimum bandwidth readjustment unit.

Furthermore, as shown in FIG. 15, the optimum bandwidth may be readjusted to an average of peripheral 8 blocks of the processing target block, or a value obtained by adding $\pm\beta$ $(0<\beta<1)$ to the average.

Any of the above methods produces similar effects.

In accordance with such readjustment, boundary lines produced due to a filtering process applied to blocks are reduced, so that the boundaries can be invisible.

If the above readjustment is individually applied to the top field and the bottom field in interlacing video processing, similar effects can be obtained when the peripheral block compared with the processing target block belongs to either the same field as the target block or the field different from the target block.

Such readjustment may also be performed by widening the allocation coefficient range in the optimum bandwidth determination table 108 having a table structure as shown in FIG. 3.

For example, in FIG. 3, if optimum bandwidth "0.8" is assigned to 1.5≦X<1.6 and optimum bandwidth "0.9" is assigned to 1.6≦X<1.7, these conditions may be changed to a condition that optimum bandwidth "0.85" is assigned to 1.5≦X<1.7.

In accordance with the third embodiment, degradation in subjective image quality, such as block distortion, can be reduced while substantially maintaining the original objective image quality.

(4) Fourth Embodiment

Figure 16:
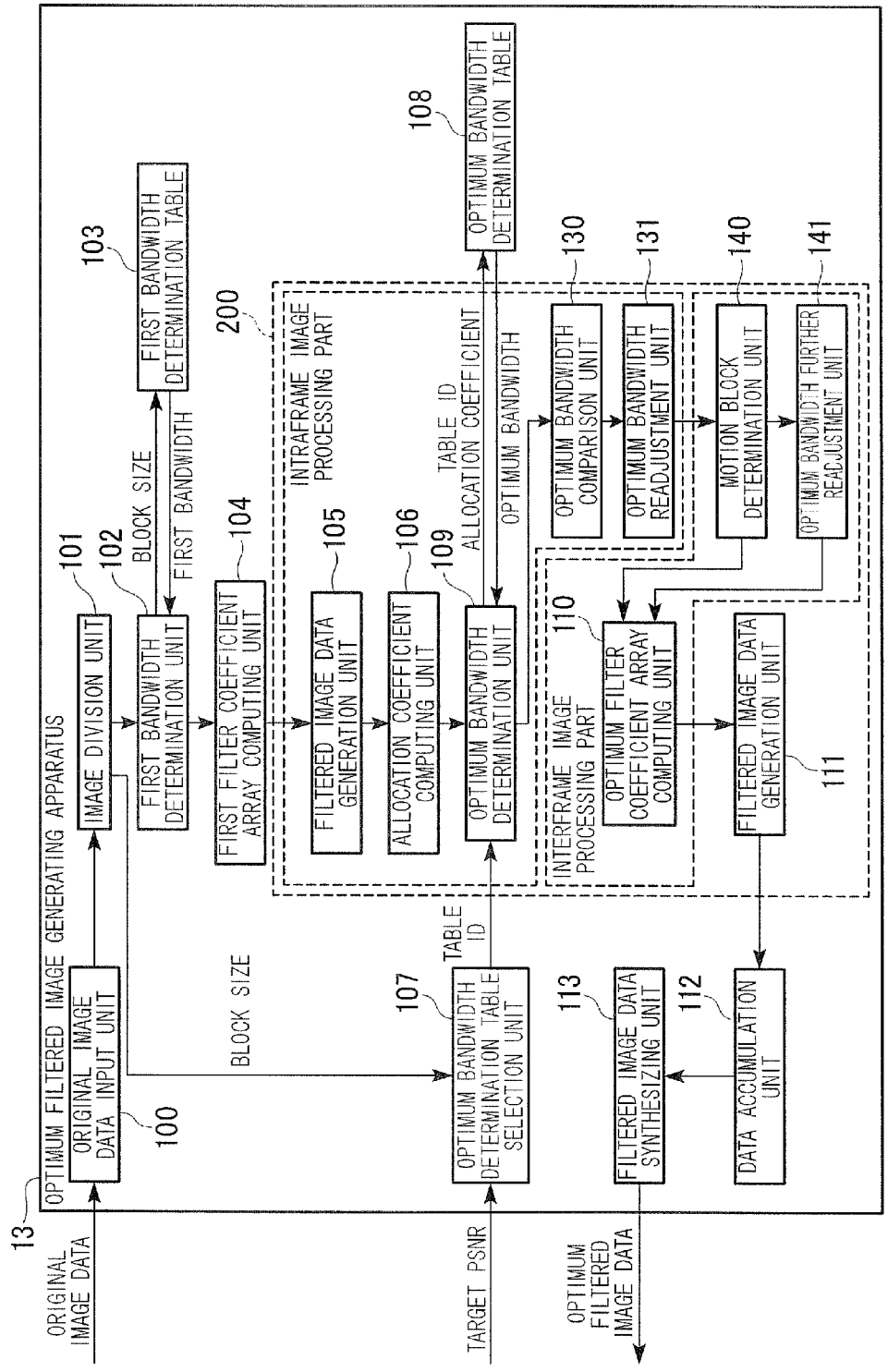
FIG. 16 is a diagram showing the structure of an optimum filtered image generating apparatus as a fourth embodiment of the present invention.

FIG. 16 shows an example of the structure of an optimum filtered image generating apparatus 13 as a fourth embodiment of the present invention.

In comparison with the optimum filtered image generating apparatus 12 (see FIG. 9) of the third embodiment, the optimum filtered image generating apparatus 13 of the fourth embodiment further includes a motion block determination unit 140 and an optimum bandwidth further readjustment unit 141.

The motion block determination unit 140 determines whether or not the block, which has the block image data B(1) (as the processing target) of the original image, has a motion (i.e., a motion is detected at the block). If it is determined that the relevant block has no motion, the motion block determination unit 140 directly transfers the processing result of the optimum bandwidth readjustment unit 131 to the optimum filter coefficient array computing unit 110.

If it is determined by the motion block determination unit 140 that the relevant block has a motion, the optimum bandwidth further readjustment unit 141' further adjusts the optimum bandwidth readjusted by the optimum bandwidth readjustment unit 131 (which may not readjust the optimum bandwidth).

Here, the filtered image data generation unit 105, the allocation coefficient computing unit 106, the optimum bandwidth determination unit 109, the optimum bandwidth comparison unit 130, and the optimum bandwidth readjustment unit 131 form an intraframe image processing part; and the optimum filter coefficient array computing unit 110, the motion block determination unit 140, and the optimum bandwidth further readjustment unit 141 form an interframe image processing part.

Figure 17:
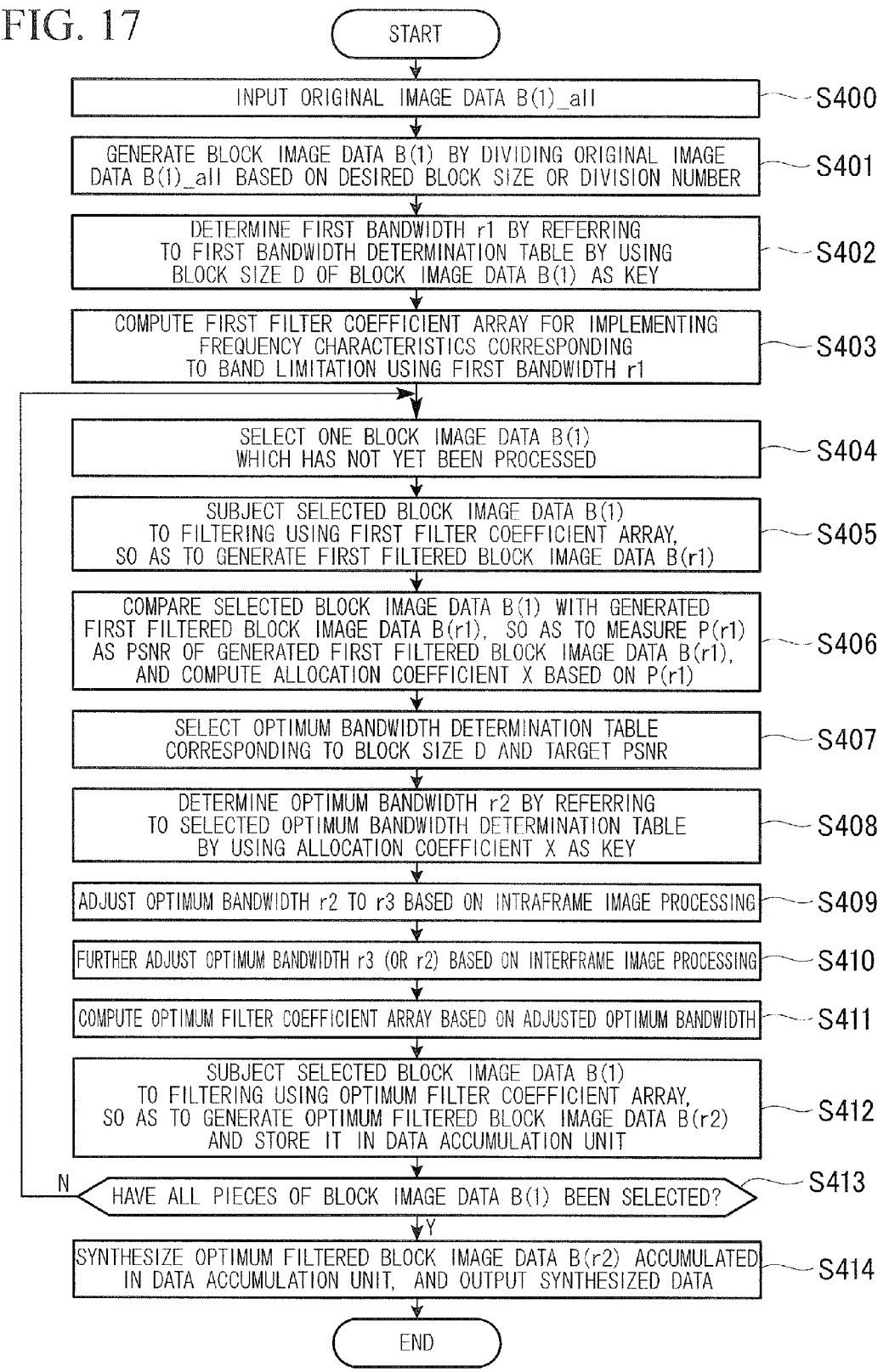
FIG. 17 shows a flowchart executed by the optimum filtered image generating apparatus of the fourth embodiment.
Figure 18:
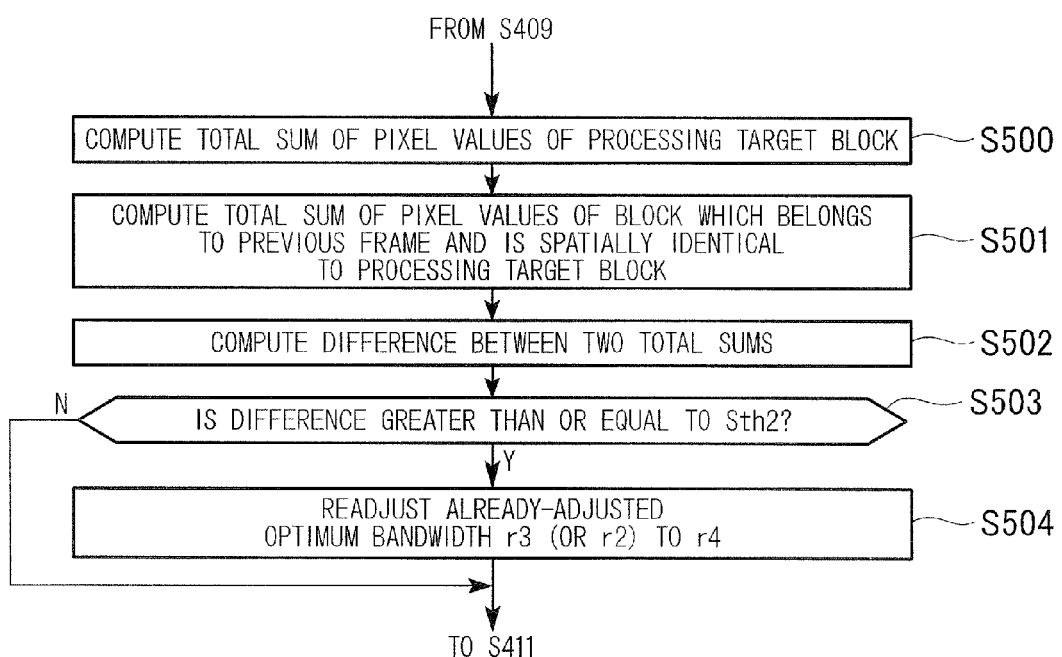
FIG. 18 also shows the flowchart executed by the optimum filtered image generating apparatus of the fourth embodiment.

FIGS. 17 and 18 show a flowchart executed by the optimum filtered image generating apparatus 13 of the present embodiment, formed as described above.

In accordance with the flowchart, the processes performed by the optimum filtered image generating apparatus 13 will be explained in detail.

As shown in the flowchart of FIG. 17, when receiving a request for generating optimum filtered image data with respect to an image (which is a processing target and forms a video image), the optimum filtered image generating apparatus 13 executes the same processes (in steps S400 to S408) as those in steps S300 to S308 of the flowchart in FIG. 10, so that the optimum bandwidth r2 (for the second path) for the selected block image data B(1) is determined.

In the next step S409, the determined optimum bandwidth r2 is adjusted based on intraframe image processing. This process of adjusting the determined optimum bandwidth r2 based on the intraframe image processing is performed similar to the process in steps S309 and S310 of the flowchart in FIG. 10.

That is, the optimum bandwidth r2 (determined in step S408) assigned to the block image data B(1) of the processing target block is compared with the optimum bandwidth assigned to the block image data B(1) of a block positioned around the target block; the difference between the compared values is computed; and it is determined whether or not the difference is greater than or equal to a predetermined threshold Sth1. If it is determined that the difference is greater than or equal to the threshold Sth1, the optimum bandwidth r2 determined in step S408 is readjusted to r3 by which the difference reduces. In contrast, if it is determined that the difference is smaller than the threshold Sth1, it is also determined that the optimum bandwidth r2 determined in step S408 is used unchanged.

In the next step S410, the optimum bandwidth r3 (or r2) adjusted in step S409 is further adjusted based on interframe image processing which will be explained using the flowchart in FIG. 18.

In the following steps S411 to S414, the same processes as those in steps S311 to S314 of the flowchart in FIGS. 10 and 11 are executed, so that the optimum filtered image data B(r2)_all having the same size as the original image data is generated and output.

Next, referring to the flowchart in FIG. 18, the optimum bandwidth readjustment process based on the interframe image processing, performed in step S410, will be explained.

After the optimum bandwidth r2 determined in step S408 is adjusted in step S409 based on the intraframe image processing (see the flowchart in FIG. 17), the operation proceeds to the flowchart in FIG. 18. In the first step S500, the total sum of the pixel values of the processing target block, to which the intra image processing has been applied, is computed. In the next step S501, the total sum of the pixel values of a block, which belongs to a previous frame (i.e., temporally prior to the frame of the target block) and is spatially identical to the processing target block, is computed.

In the above process, the total sum of the pixel values of the block image data B(1) (i.e., image data of the original image) may be computed, or the total sum of the pixel values of the first filtered image data B(r1) (i.e., filtered image data) may be computed.

In the next step S502, the difference between the total sum computed in step S500 and the total sum computed in step S501 is computed. In the next step S503, it is determined whether or not the difference is greater than or equal to a predetermined threshold Sth2.

In accordance with the above determination, if it is determined that the difference between the total sum of the pixel values of the processing target block and the total sum of the pixel values of a block which belongs to a previous frame and is spatially identical to the processing target block is greater than or equal to the threshold Sth2, then it is determined that the processing target block has a motion, and the operation proceeds to step S504. In step S504, the optimum bandwidth r3 (or r2) adjusted in step S409 is further adjusted to r4 so as to reduce the optimum bandwidth r3 (or r2), and the operation proceeds to step S411 of the flowchart in FIG. 17.

For example, the optimum bandwidth r3 (or r2) adjusted in step S409 is multiplied by a weight W smaller than 1 (i.e., 0<W<1) so as to further adjust r3 (or r2) to r4, and the operation then proceeds to step S411 of the flowchart in FIG. 17.

In accordance with the above adjustment, a high-frequency component in a block having a motion can be considerably limited.

In contrast, if it is determined in the above determination that the difference between the total sum of the pixel values of the processing target block and the total sum of the pixel values of a block which belongs to a previous frame and is spatially identical to the processing target block is smaller than the threshold Sth2, then the process of step S504 is not executed, and it is determined that the optimum bandwidth r3 (or r2) adjusted in step S409 is used unchanged. The operation then proceeds to step S411 of the flowchart in FIG. 17.

Although the total sum of the pixel values in a block is computed in the flowchart of FIG. 18, an average of the pixel values in a block may be computed.

In contrast with the first, second, and third embodiments, in accordance with the fourth embodiment, the original subjective image quality can be substantially maintained although the objective image quality is changed, that is, it is possible to prevent degradation in the subjective image quality and to improve the relevant encoding efficiency.

(5) Fifth Embodiment

Figure 19:
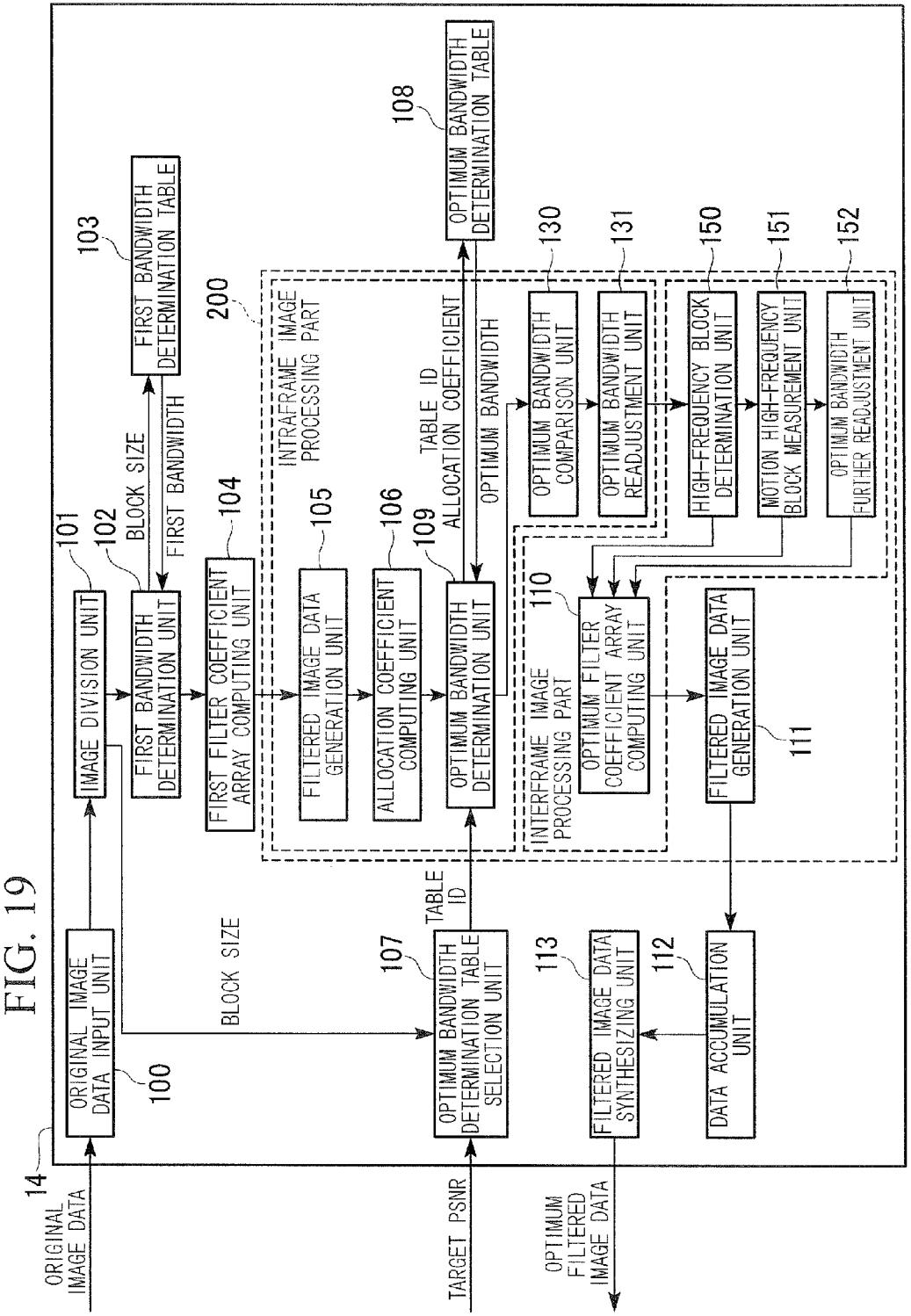
FIG. 19 is a diagram showing the structure of an optimum filtered image generating apparatus as a fifth embodiment of the present invention.

FIG. 19 shows an example of the structure of an optimum filtered image generating apparatus 14 as a fifth embodiment of the present invention.

In comparison with the optimum filtered image generating apparatus 12 (see FIG. 9) of the third embodiment, the optimum filtered image generating apparatus 14 of the fifth embodiment further includes a high-frequency block determination unit 150, a motion high-frequency block measurement unit 151, and an optimum bandwidth further readjustment unit 152.

The high-frequency block determination unit 150 determines whether or not the block, which has the block image data B(1) (as the processing target) of the original image, is a block characterized by a high-frequency component. If it is determined that the relevant block is not such a high-frequency component block, the high-frequency block determination unit 150 directly transfers the processing result of the optimum bandwidth readjustment unit 131 to the optimum filter coefficient array computing unit 110.

If it is determined by the high-frequency block determination unit 150 that the relevant block a high-frequency component block, the motion high-frequency block measurement unit 151 measures the number of high-frequency component blocks in the frame to which the processing target block belongs, and also the number of high-frequency component blocks in a previous frame (i.e., temporally prior to the frame of the target block). Based on the measurement results, the motion high-frequency block measurement unit 151 determines whether or not the processing target block has a motion (i.e., a motion is detected at the block). If it is determined that the relevant block has no motion, the motion high-frequency block measurement unit 151 directly transfers the processing result of the optimum bandwidth readjustment unit 131 to the optimum filter coefficient array computing unit 110.

If it is determined by the motion high-frequency block measurement unit 151 that the relevant block has a motion, that is, it is finally determined that the processing target block is a high-frequency component block having a motion, then the optimum bandwidth further readjustment unit 152 further adjusts the optimum bandwidth readjusted by the optimum bandwidth readjustment unit 131 (which may not readjust the optimum bandwidth).

Here, the filtered image data generation unit 105, the allocation coefficient computing unit 106, the optimum bandwidth determination unit 109, the optimum bandwidth comparison unit 130, and the optimum bandwidth readjustment unit 131 form an intraframe image processing part; and the optimum filter coefficient array computing unit 110, the high-frequency block determination unit 150, the motion high-frequency block measurement unit 151, and the optimum bandwidth further readjustment unit 152 form an interframe image processing part.

Similar to the optimum filtered image generating apparatus 13 of the fourth embodiment, the optimum filtered image generating apparatus 14 of the fifth embodiment having the above-described structure executes the flowchart of FIG. 17. However, in contrast with the optimum filtered image generating apparatus 13, the optimum filtered image generating apparatus 14 executes the optimum bandwidth adjustment process based on the interframe image processing (see step S410) in accordance with a flowchart in FIG. 20.

Below, referring to the flowchart in FIG. 20, the optimum bandwidth adjustment process based on the interframe image processing, performed by the optimum filtered image generating apparatus 14 of the present embodiment, will be explained.

Figure 20:
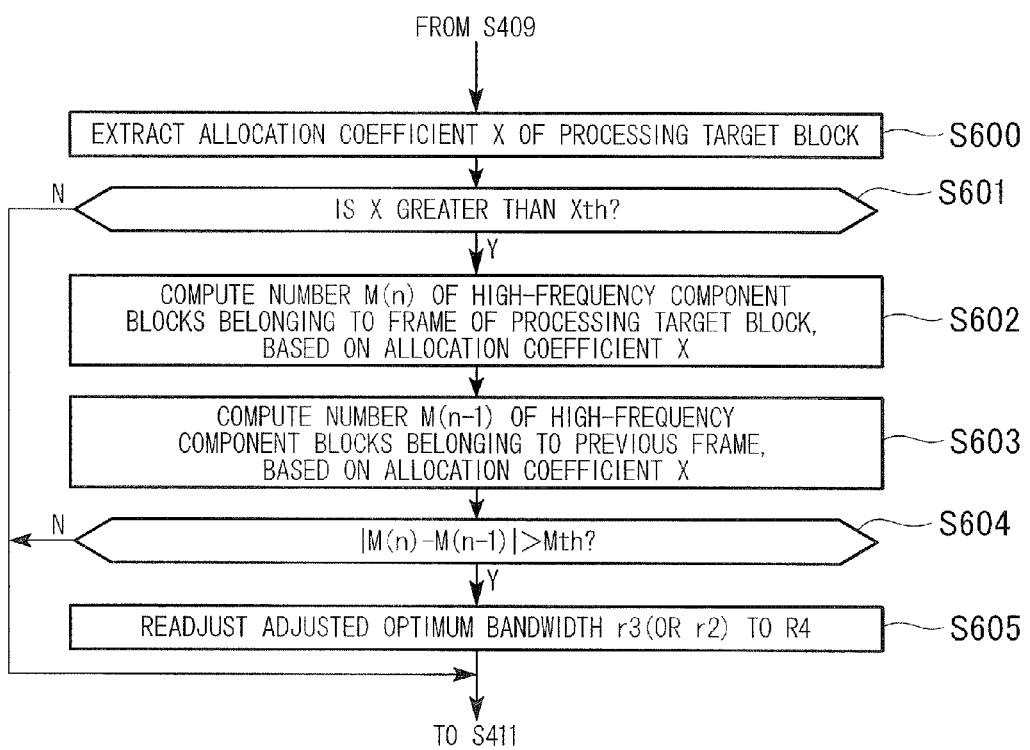
FIG. 20 shows a flowchart executed by the optimum filtered image generating apparatus of the fifth embodiment.

In the optimum filtered image generating apparatus 14, after the optimum bandwidth r2 determined in step S408 is adjusted in step S409 based on the intraframe image processing (see the flowchart in FIG. 17), the operation proceeds to the flowchart in FIG. 20. In the first step S600, the allocation coefficient X(n,m) of the processing target block, to which the intraframe image processing has been applied), is extracted.

The allocation coefficient X(n,m) was computed in step S406 of the flowchart in FIG. 17, where n is the number of the frame to which the processing target block belongs, and m is the number of the processing target block.

In the next step S601, it is determined whether or not the extracted allocation coefficient X(n,m) is greater than a predetermined threshold Xth. If it is determined that the extracted allocation coefficient X(n,m) is smaller than or equal to the threshold Xth, then it is further determined that the processing target block is not a block characterized by a high-frequency component, and that the optimum bandwidth r3 (or r2) adjusted in step S409 (of the flowchart in FIG. 17) is used unchanged without performing the following processes. Accordingly, the operation proceeds to step S411 of the flowchart in FIG. 17.

In contrast, if it is determined in step S601 that the extracted allocation coefficient X(n,m) is greater than the threshold Xth, then it is further determined that the processing target block is a high-frequency component block, and the operation proceeds to step S602. In step S602, based on the allocation coefficient X of each block in the frame to which the processing target block belongs, the number M(n) of high-frequency component blocks belonging to the relevant frame is computed.

In the next step S603, based on the allocation coefficient X of each block in a previous frame immediately before the frame to which the processing target block belongs, the number M(n−1) of high-frequency component blocks belonging to the previous frame is computed.

In the next step S604, the difference |M(n−1)−M(n−1)| between the number M(n) of blocks computed in step S602 and the number M(n−1) of blocks computed in step S603 is computed, and it is determined whether or not the difference is greater than a predetermined threshold Mth. If it is determined that the difference is smaller than or equal to the threshold Mth, then it is also determined that the frame to which the processing target block belongs indicates no motion and that the processing target block is not a block having a motion. Therefore, it is further determined that the optimum bandwidth r3 (or r2) adjusted in step S409 (of the flowchart in FIG. 17) is used unchanged without performing the following processes. Accordingly, the operation proceeds to step S411 of the flowchart in FIG. 17.

In contrast, if it is determined in step S604 that the difference |M(n−1)−M(n−1) between the number M(n) of blocks computed in step S602 and the number M(n-1) of blocks computed in step S603 is greater than the threshold Mth, then it is also determined that the frame to which the processing target block belongs indicates that there is a motion and that the processing target block is a block having a motion. Therefore, the operation proceeds to step S605, where the optimum bandwidth r3 (or r2) adjusted in step S409 is further adjusted to r4 so as to reduce r3 (or r2). The operation then proceeds to step S411 of the flowchart in FIG. 17.

For example, the optimum bandwidth r3 (or r2) adjusted in step S409 is multiplied by a weight W smaller than 1 (i.e., 0<W<1) so as to further adjust r3 (or r2) to r4, and the operation then proceeds to step S411 of the flowchart in FIG. 17.

In accordance with the above adjustment, a high-frequency component in a high-frequency component block having a motion can be considerably limited.

Below, the above-described operation will be concretely explained.

Here, it is assumed that the optimum bandwidth r2 (or r3) which has been obtained by the process of the optimum bandwidth readjustment unit 131 is 0.9; the frame number n of the frame to which the processing target block belongs is 5; the block number m of the relevant block is 1000; the computed allocation coefficient X(5,1000) is greater than 1.9; the threshold Xth(=1.9) is provided to the high-frequency block determination unit 150; Mth(=15) is provided to the motion high-frequency block measurement unit 151; and a weighting factor W(=0.7) is provided to the optimum bandwidth further readjustment unit 152.

First, the high-frequency block determination unit 150 determines that the processing target block is a high-frequency component block because the allocation coefficient X(5,1000) computed by the allocation coefficient computing unit 106 is greater than Xth(=1.9).

Next, the motion high-frequency block measurement unit 151 computes the number of blocks which satisfy that "X(5) >Xth(=1.9)" among the allocation coefficients X(5) computed by the allocation coefficient computing unit 106, and also computes, for the fourth frame immediately before the fifth frame, the number of blocks which satisfy that "X(4) >Xth(=1.9)" among the allocation coefficients X(4). Here, it is assumed that the computed numbers M(5) and M(4) are respectively 11 and 35.

Next, the motion high-frequency block measurement unit 151 computes the difference |M(5)−M(4)| between the computed M(5) and M(4), so that |11-35|=24. In such a case, 24 is greater than Mth(=15), and thus it is finally determined that the processing target block is a high-frequency component block having a motion.

Accordingly, the optimum bandwidth further readjustment unit 152 applies weighting to the optimum bandwidth r2 of the processing target block, so that r4=r2×W(=0.7), and the optimum bandwidth r4 is 0.63. The filtering process using this updated optimum bandwidth is then performed so as to obtain final optimum filtered image data.

As understood by the above operation, when each of the blocks corresponding to "M(5)=11" becomes the processing target block, the optimum bandwidth r2 thereof is subjected to similar weighting (i.e., r4=r2×W(=0.7)), and the filtering process using this updated optimum bandwidth is performed so as to obtain final optimum filtered image data.

In accordance with the above operation, the PSNR of each high-frequency block having a motion becomes 30 dB, and the PSNR of each high-frequency block having no motion becomes 40 dB, where the difference is visually inconspicuous.

In a case in which M(5)=11 and M(4)=21, the condition "|M(5)−M(4)|>Mth" is not satisfied, so that it is determined that the processing target block is a high-frequency block having no motion. Therefore, adjustment in the optimum bandwidth further readjustment unit 152 is unnecessary, and the optimum bandwidth r2 becomes optimum bandwidth r4 unchanged. The relevant filtering process is then performed so as to obtain optimum filtered image data.

The above M(n) is changed depending on Xth, and the criterion for determining the presence or absence of motion is defined depending on Mth. Therefore, Xth and Mth should be set in consideration of the block size or the like.

For the setting of Mth, instead of providing a fixed numerical value, it may be set as "Mth=E×0.1", that is, as a ratio to the frame division number E.

If a ratio such as "Mth=E×0.1" is used, then in comparison with the previous frame, 10% of the number of high-frequency component blocks is changed from the high-frequency component block to the low-frequency component block while the corresponding number of low-frequency component blocks is changed from the low-frequency component block to the high-frequency component block. Also in this case, similar effects to those obtained when providing a fixed numerical value can be obtained.

In addition, although the previous frame immediately before the current frame is referred to in the comparison of the number of high-frequency component blocks, similar effects can be obtained when referring to another frame before or after the current frame.

In accordance with the fifth embodiment, a high-frequency component can be considerably limited in an area having a motion. Therefore, in contrast with the first, second, and third embodiments, similar to the fourth embodiment, the original subjective image quality can be substantially maintained although the objective image quality is changed, and thus it is possible to prevent degradation in the subjective image quality and to improve the relevant encoding efficiency.

That is, in accordance with the fifth embodiment, a high-frequency component having a motion can be considerably limited. Therefore, the encoding efficiency can be improved with less degradation in the subjective image quality in comparison with the fourth embodiment.

(6) About the Present Invention

As explained in the first or second embodiment, the present invention does not employ a method in which optimum filtered image data B(r2)_all is generated using a common optimum bandwidth r2 for an entire frame of the relevant video image, but generates optimum filtered image data B(r2) using a optimum bandwidth r2 assigned to each block defined by dividing image data of a frame, and further generates optimum filtered image data B(r2)_all by synthesizing each optimum filtered image data B(r2).

Figure 21:
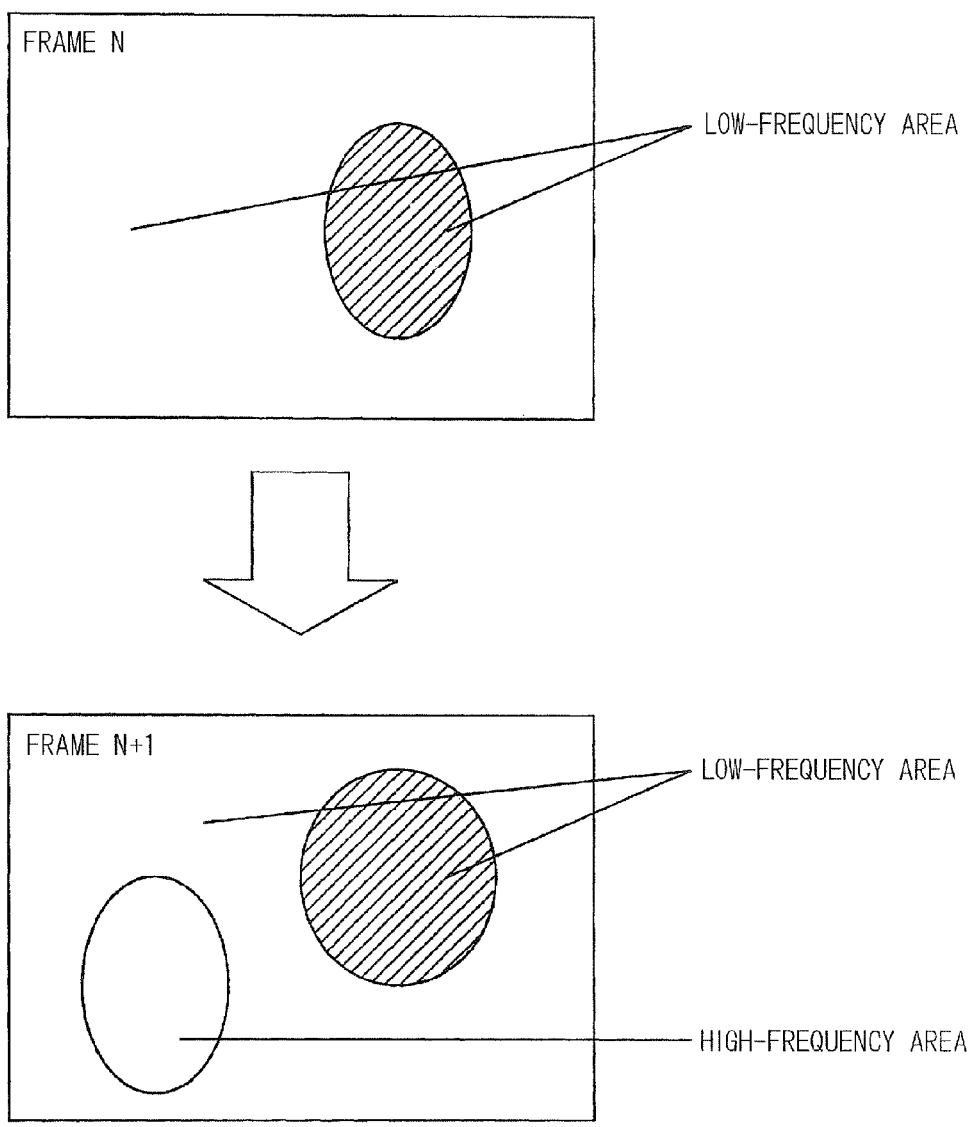
FIG. 21 is a diagram for explaining the image in a frame.

Therefore, if only an area characterized by a low-frequency component is present in the relevant frame (see frame N in FIG. 21), the optimum filtered image data is generated using a filter strength corresponding to the low-frequency component.

In contrast, if both an area characterized by a low-frequency component and an area characterized by a high-frequency component are present in the relevant frame (see frame N+1 in FIG. 21), the optimum filtered image data is generated by separately applying a filter strength corresponding to the low-frequency component to the low-frequency component area and a filter strength corresponding to the high-frequency component to the high-frequency component area.

Therefore, in accordance with the present invention, (i) each frame can have a uniform image quality and thus have a uniform appearance, and (ii) the image quality within each frame can be uniform, and thus the appearance within the frame can also be uniform.

Also in accordance with the present invention having the above effects, noises at area boundaries caused by a filtering process applied to each area can be reduced as described in the third embodiment, thereby reducing degradation in the subjective image quality.

Also in accordance with the present invention having the above effects, a high-frequency component in an area having a motion can be considerably limited as described in the fourth embodiment, or a high-frequency component in a high-frequency component area having a motion can be considerably limited as described in the fifth embodiment, thereby improving the encoding efficiency without causing degradation in the subjective image quality.

Figure 22:
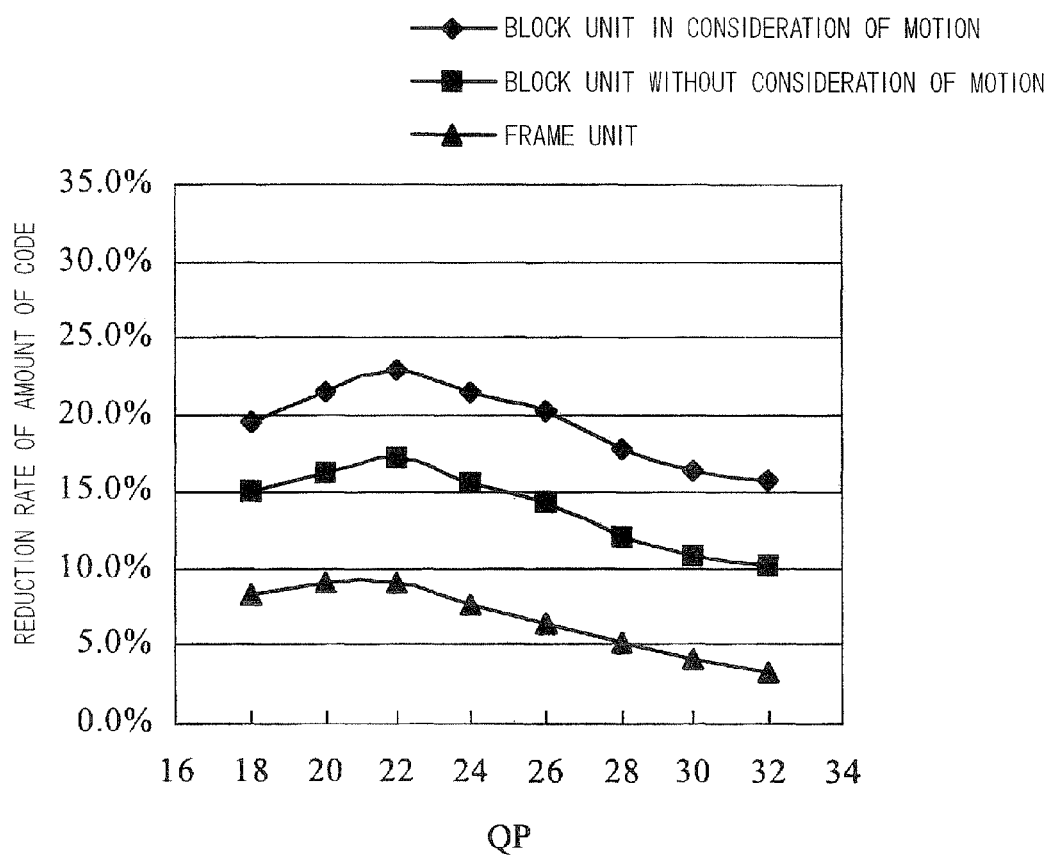
FIG. 22 is a diagram showing the results of an experiment performed for verifying the effectiveness of the present invention.
Figure 23:
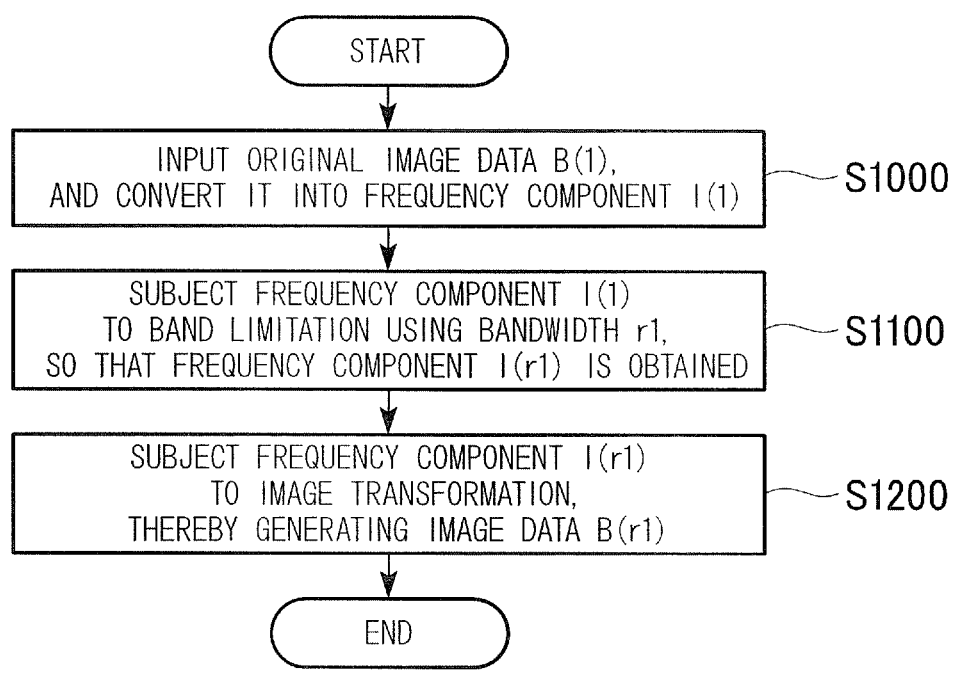
FIG. 23 is a diagram used for explaining an image processing method including a band limitation.
Figure 24:
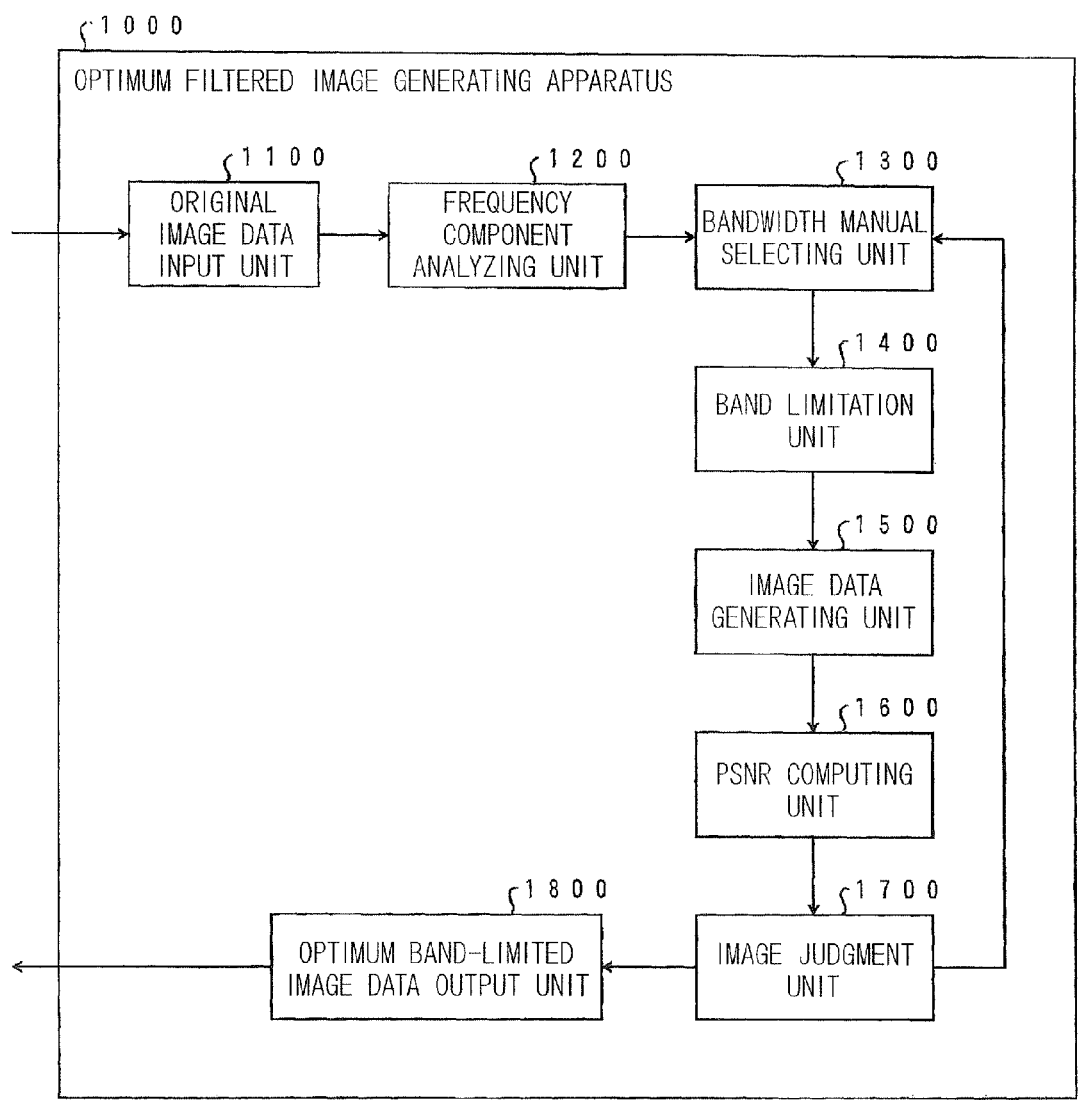
FIG. 24 shows the structure of an optimum filtered image generating apparatus for generating optimum filtered image data by performing a "round-robin" band limitation.
Figure 25:
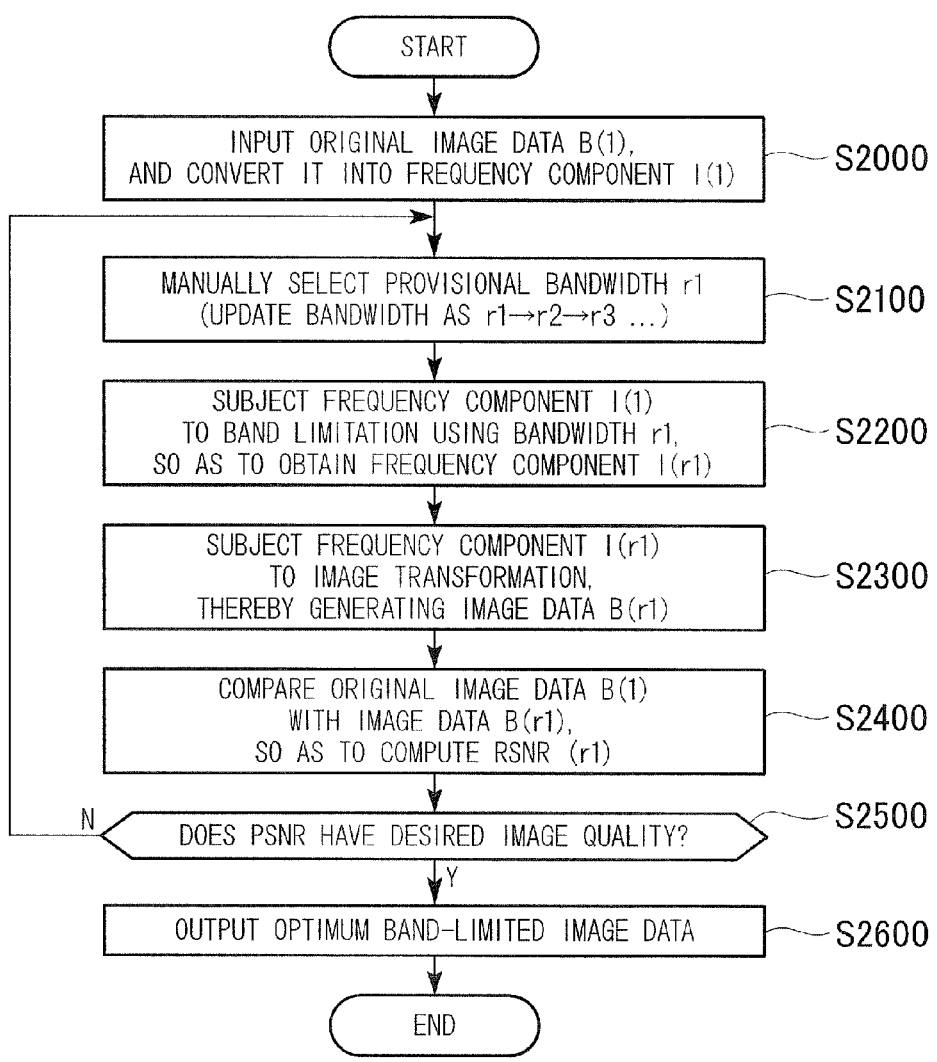
FIG. 25 is an operation flow executed by the optimum filtered image generating apparatus for generating optimum filtered image data by performing a "round-robin" band limitation.
Figure 26:
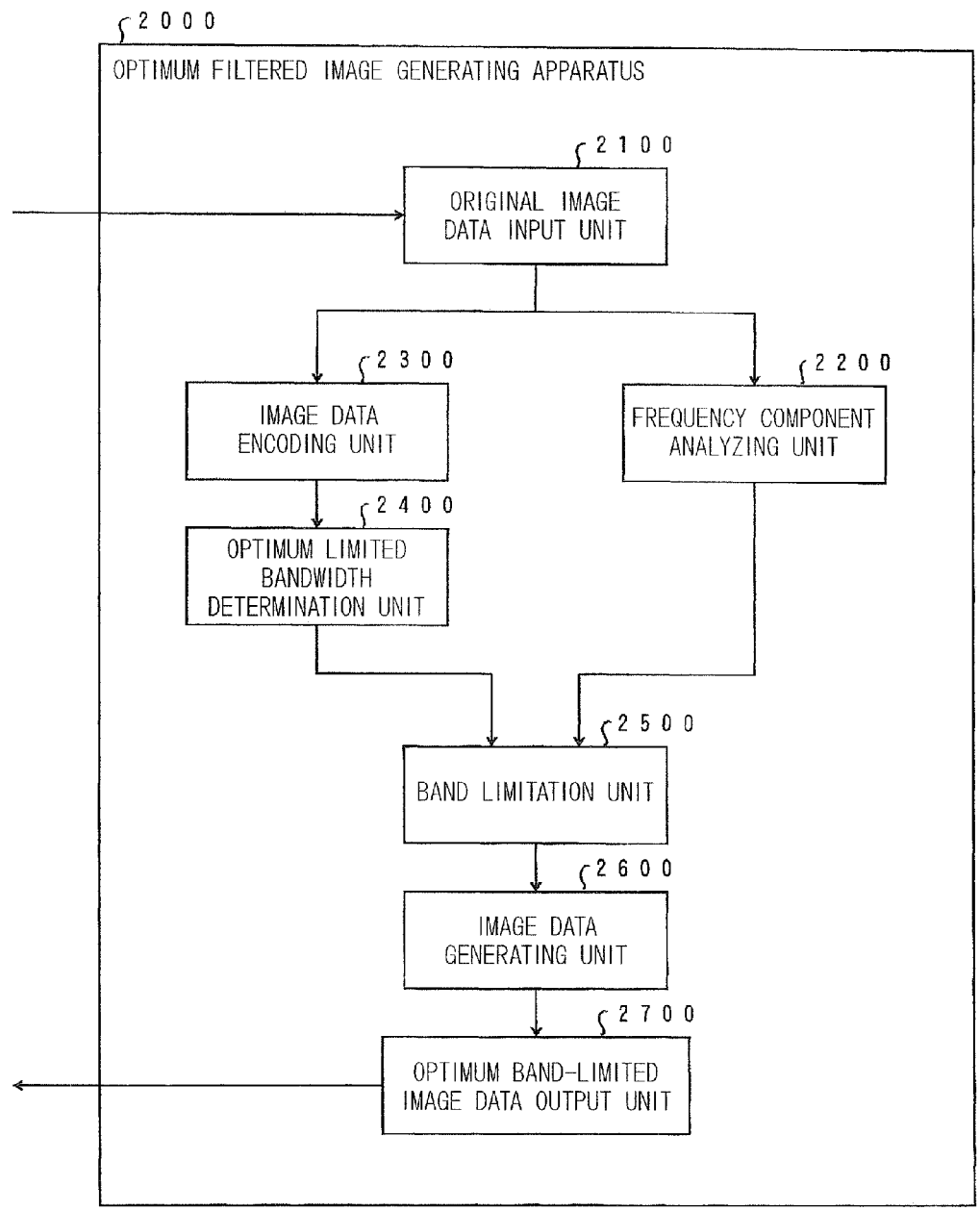
FIG. 26 shows the structure of a conventional optimum filtered image generating apparatus.
Figure 27:
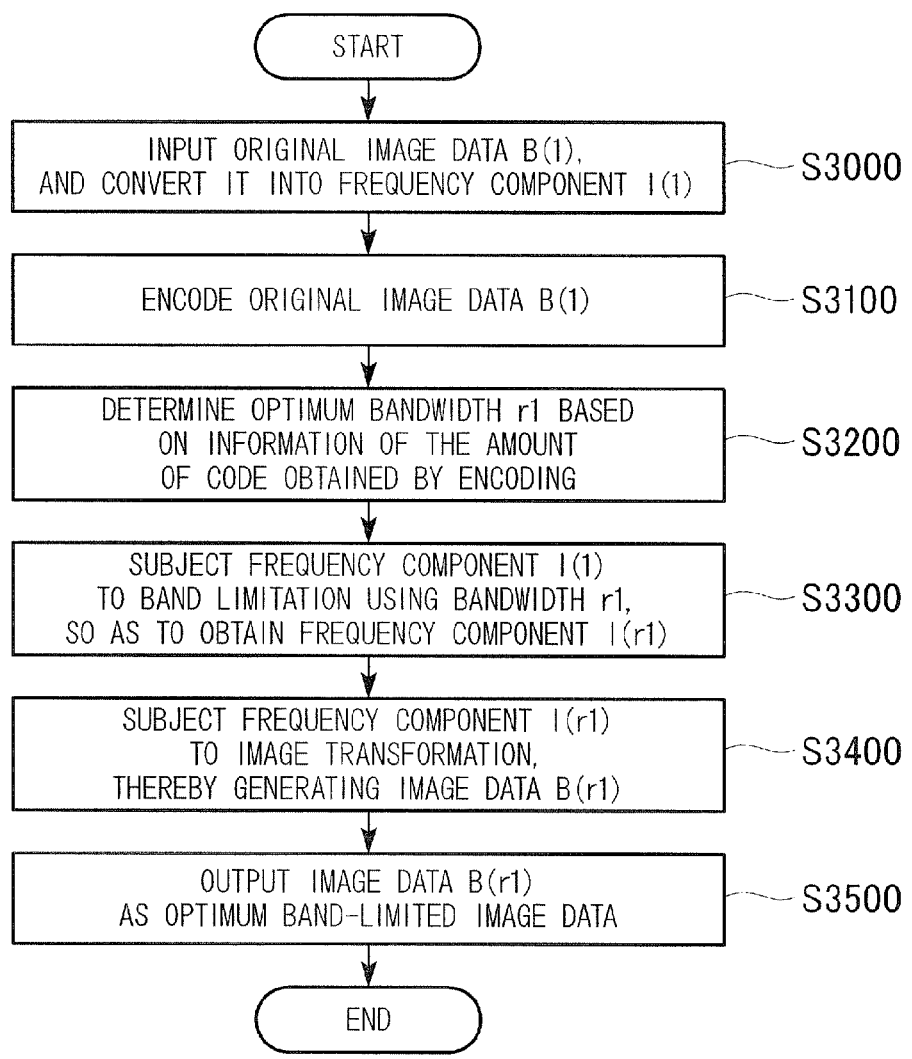
FIG. 27 is an operation flow executed by the conventional optimum filtered image generating apparatus.

FIG. 22 shows the results of an experiment performed for verifying the effectiveness of the present invention.

In comparison with the present invention, in the above experiment, comparative optimum filtered image data was generated using a common optimum bandwidth for an entire frame. Additionally, optimum filtered image data in accordance with the third embodiment was generated, whose subjective image quality was substantially equal to that of the comparative optimum filtered image data. Furthermore, optimum filtered image data in accordance with the fourth embodiment was generated, whose subjective image quality was substantially equal to that of the comparative optimum filtered image data. The above three pieces of optimum filtered image data were subjected to encoding under the same conditions, and the amount of code was computed. Then the reduction rate was computed by comparing each amount of code with the amount of code obtained by encoding the original image data.

In FIG. 22, the horizontal axis indicates a quantization parameter (QP) used for the encoding, and the vertical axis indicates the reduction rate of the amount of code In FIG. 22, (i) experimental data of "frame unit" was obtained by generating the optimum filtered image data using the common optimum bandwidth for the entire frame, (ii) experimental data of "block unit in consideration of motion" was obtained by generating the optimum filtered image data in accordance with the third embodiment, and (iii) experimental data of "block unit without consideration of motion" was obtained by generating the optimum filtered image data in accordance with the fourth embodiment.

Referring to the experimental data, it could be verified that the amount of generated code can be considerably reduced using the present invention while substantially maintaining the original subjective image quality. Therefore, the effectiveness of the present invention could be verified.

Although the present invention has been explained in accordance with the embodiments by referring the drawings, the present invention is not limited to the embodiments.

For example, although it is assumed that the PSNR is used as an example of error information in the above-explained embodiments, similar effects can be obtained if using a mean square error, a variance, or the like, which includes error information of the relevant pixels.

Additionally, the above-explained embodiments assume an example in which the image size of the original image is 1920×1080, and the block size is 32×18. However, the first bandwidth determination table 103 which defines the first bandwidths r1 corresponding to various original image data sizes and block sizes may be prepared in advance, and provided to the first bandwidth determination unit 102, so as to apply the present invention to images having any desired size.

In addition, the above-explained embodiments assume that each block has a rectangular shape. However, the shape of each block is also not limited, and similar effects can be obtained by employing a shape (e.g., a cross, a triangle, or a circle) other than the rectangle.

The above-explained embodiments also assume that the image division number is the same in both horizontal and vertical directions. However, similar effects can be obtained even when different division numbers (e.g., $E_1$ and $E_5$) are respectively assigned to the horizontal and vertical directions.

In addition, the fourth and fifth embodiments assume that the weighting factor has the same value in both horizontal and vertical directions. However, similar effects can be obtained even when different values are used.

The above-explained embodiments also assume that the first bandwidth and the optimum bandwidth are each the same in both horizontal and vertical directions. However, similar effects can be obtained even when different values (e.g., $B_1$ and $B_5$ (for band limitation)) are respectively assigned to the horizontal and vertical directions, so as to positively use the following effect: in a video image showing a natural distant view or a truck, there occurs a larger variation in brightness in the vertical direction in comparison with the horizontal direction because there is attraction in the vertical direction.

Although the above embodiments have provided no explanation about what type of filter is used, a 7-tap digital filter may be used, and similar effects can be obtained by employing another number of taps.

In addition, no specific limitation is imposed on a method of designing a digital filter for implementing a designated band limitation. For example, a desired frequency-characteristic form may be subjected to an inverse Z conversion, so as to obtain and design a filter coefficient array of a digital filter having the relevant frequency characteristics.

Also in the above embodiments, "51.2" is employed as the value of G in the formula used for computing the allocation coefficient X. However, the value of G depends on the characteristics of an employed digital filter, and should be appropriately modified when a different digital filter is used.

Although the above embodiments have provided no specific explanation, the band processing may be applied, not only to the brightness component, but also to a color-difference component. In such a case, the encoding efficiency can be further improved.

Additionally, in the embodiments, only the threshold for the lower limit is employed such as "X(n,m)>Xth". However, similar effects can be obtained when setting a threshold for the upper limit.

In addition, the above-explained fourth and fifth embodiments each perform the intraframe image processing and the interframe image processing. However, similar effects can be obtained even when performing any one of the intraframe image processing and the interframe image processing.

Although no explanation for combination between the above-described embodiments has been provided, any combination between the embodiments is possible, and similar effects can be obtained even when the execution order of the relevant processes is modified.

Industrial Applicability

In accordance with the present invention, an adaptive filtering process for images which form a video image can be implemented with no encoding process and no repetitive operation, and in consideration of a frequency distribution in a frame or between frames of the images, thereby efficiently generating a filtered image having a specific image quality estimation value.

The invention claimed is:
1. A video processing method which uses no encoding data of a video image and can be voluntarily controlled using a standard for estimating the subjective or objective image quality, the method comprising the steps of:
  dividing a processing target image, which forms a video image, into a plurality of divided areas;
  determining a first bandwidth applied to the divided areas;
  computing a first filter coefficient array for implementing frequency characteristics corresponding to a band limitation using the first bandwidth;
  generating filtered divided image data of each divided area by subjecting image data of each divided area to a filtering process using the first filter coefficient array;
  deriving, for each divided area, a value of error information between the image data of each divided area and the filtered divided image data, and computing an allocation coefficient used for determining an optimum bandwidth, based on the derived value;
  determining, for each divided area, the optimum bandwidth corresponding to the allocation coefficient;
  computing, for each divided area, an optimum filter coefficient array for implementing the frequency characteristics corresponding to a band limitation using the determined optimum bandwidth;
  generating optimum filtered divided image data of each divided area by subjecting the image data of each divided area to a filtering process using the optimum filter coefficient array;
  synthesizing the optimum filtered divided image data of each divided area without iterating the foregoing steps; and
  outputting the synthesized data as optimum filtered image data.

2. A video processing method which uses no encoding data of a video image and can be voluntarily controlled using a standard for estimating the subjective or objective image quality, the method comprising the steps of:
  determining a first bandwidth applied to divided areas which are set on a processing target image which forms a video image, so as to section the processing target image;
  computing a first filter coefficient array for implementing frequency characteristics corresponding to a band limitation using the first bandwidth;
  generating filtered image data by subjecting image data of the processing target image to a filtering process using the first filter coefficient array;
  deriving, for each divided area, a value of error information between the image data of the processing target image and the filtered image data, and computing an allocation coefficient used for determining an optimum bandwidth, based on the derived value;
  determining, for each divided area, the optimum bandwidth corresponding to the allocation coefficient;
  computing, for each divided area, an optimum filter coefficient array for implementing the frequency characteristics corresponding to a band limitation using the determined optimum bandwidth;
  generating optimum filtered divided image data of each divided area by subjecting the image data of each divided area to a filtering process using the optimum filter coefficient array;
  synthesizing the optimum filtered divided image data of each divided area without iterating the foregoing steps; and
  outputting the synthesized data as optimum filtered image data.

3. The video processing method in accordance with claim 1 or 2, wherein:
  in the step of determining the first bandwidth, the first bandwidth is determined based on the size of each divided area.

4. The video processing method in accordance with claim 1 or 2, further comprising the steps of:
  comparing, for each divided area, the determined optimum bandwidth with an optimum bandwidth of a peripheral divided area around the present divided area; and
  correcting the determined optimum bandwidth based on a result of the comparison.

5. The video processing method in accordance with claim 1 or 2, further comprising the steps of:
  determining whether or not the image data of each divided area has a motion by using image data of a frame before or after the frame of the area, or image data of frames before and after the frame of the area; and
  correcting the determined optimum bandwidth of each divided area for which it is determined that the image data of the divided area has a motion.

6. The video processing method in accordance with claim 5, wherein:
  the step of determining whether or not the image data of each divided area has a motion is performed by estimating a pixel-value variation from each used frame to the present frame.

7. The video processing method in accordance with claim 5, wherein:
  the step of determining whether or not the image data of each divided area has a motion is performed by determining whether or not the image data of the divided area has a motion and is characterized by a high-frequency component; and
  the step of correcting the determined optimum bandwidth is performed by correcting the determined optimum bandwidth of each divided area for which it is determined that the image data thereof has a motion and is characterized by a high-frequency component.

8. The video processing method in accordance with claim 7, wherein:
  the step of determining whether or not the image data of each divided area has a motion and is characterized by a high-frequency component is performed by:
  determining whether or not a value, which represents an attribute of the image data of the divided area, indicates that the image data is characterized by a high-frequency component; and
  estimating a variation in the number of the divided areas for which it is indicated that the image data is characterized by a high-frequency component, from each used frame to the present frame.

9. The video processing method in accordance with claim 1 or 2, wherein:
  in the step of determining the optimum bandwidth, the optimum bandwidth corresponding to the allocation coefficient is determined by referring to an optimum bandwidth determination table in which a correspondence relationship between the allocation coefficient and the optimum bandwidth is defined.

10. The video processing method in accordance with claim 9, wherein:
  in the step of determining the optimum bandwidth, when a plurality of the optimum bandwidth determination tables are provided in correspondence to the image size and a target value of the error information, the optimum bandwidth determination table, which corresponds to the size of the divided area and a designated target value of the error information, is selected, and the optimum bandwidth corresponding to the allocation coefficient is determined by referring to the selected optimum bandwidth determination table.

11. The video processing method in accordance with claim 1 or 2, wherein:

the step of computing the allocation coefficient is performed by dividing a value of the error information, which is obtained in a state extremely close to a state that performs no band limitation, by the derived value of the error information.

12. A video processing apparatus whose operation uses no encoding data of a video image and can be voluntarily controlled using a standard for estimating the subjective or objective image quality, the apparatus comprising:

a device for dividing a processing target image, which forms a video image, into a plurality of divided areas;

a device for determining a first bandwidth applied to the divided areas;

a device for computing a first filter coefficient array for implementing frequency characteristics corresponding to a band limitation using the first bandwidth;

a device for generating filtered divided image data of each divided area by subjecting image data of each divided area to a filtering process using the first filter coefficient array;

a device for deriving, for each divided area, a value of error information between the image data of each divided area and the filtered divided image data, and computing an allocation coefficient used for determining an optimum bandwidth, based on the derived value;

a device for determining, for each divided area, the optimum bandwidth corresponding to the allocation coefficient;

a device for computing, for each divided area, an optimum filter coefficient array for implementing the frequency characteristics corresponding to a band limitation using the determined optimum bandwidth;

a device for generating optimum filtered divided image data of each divided area by subjecting the image data of each divided area to a filtering process using the optimum filter coefficient array;

a device for synthesizing the optimum filtered divided image data of each divided area without iterating operations of the foregoing devices; and a device for outputting the synthesized data as optimum filtered image data.

13. A video processing apparatus whose operation uses no encoding data of a video image and can be voluntarily controlled using a standard for estimating the subjective or objective image quality, the apparatus comprising:

a device for determining a first bandwidth based on the divided area size of divided areas which are set on a processing target image which forms a video image, so as to section the processing target image;

a device for computing a first filter coefficient array for implementing frequency characteristics corresponding to a band limitation using the first bandwidth;

a device for generating filtered image data by subjecting image data of the processing target image to a filtering process using the first filter coefficient array;

a device for deriving, for each divided area, a value of error information between the image data of the processing target image and the filtered image data, and computing an allocation coefficient used for determining an optimum bandwidth, based on the derived value;

a device for determining, for each divided area, the optimum bandwidth corresponding to the allocation coefficient;

a device for computing, for each divided area, an optimum filter coefficient array for implementing the frequency characteristics corresponding to a band limitation using the determined optimum bandwidth;

a device for generating optimum filtered divided image data of each divided area by subjecting the image data of each divided area to a filtering process using the optimum filter coefficient array;

a device for synthesizing the optimum filtered divided image data of each divided area without iterating operations of the foregoing devices; and a device for outputting the synthesized data as optimum filtered image data.

14. The video processing apparatus in accordance with claim 12 or 13, further comprising:

a device for comparing, for each divided area, the determined optimum bandwidth with an optimum bandwidth of a peripheral divided area around the present divided area; and a device for correcting the determined optimum bandwidth based on a result of the comparison.

15. The video processing apparatus in accordance with claim 12 or 13, further comprising:

a device for determining whether or not the image data of each divided area has a motion by using image data of a frame before or after the frame of the area, or image data of frames before and after the frame of the area; and a device for correcting the determined optimum bandwidth of each divided area for which it is determined that the image data of the divided area has a motion.

16. The video processing apparatus in accordance with claim 15, wherein:

the device for determining whether or not the image data of each divided area has a motion determines whether or not the image data of the divided area has a motion and is characterized by a high-frequency component; and the device for correcting the determined optimum bandwidth corrects the determined optimum bandwidth of each divided area for which it is determined that the image data thereof has a motion and is characterized by a high-frequency component.

17. A non-transitory computer-readable storage medium which stores a video processing program by which a computer executes a process for implementing the video processing method in accordance with claim 1 or 2.

* * * * *